United States Patent
Yang et al.

(10) Patent No.: US 12,499,752 B2
(45) Date of Patent: Dec. 16, 2025

(54) TRAFFIC SIMULATION METHOD AND APPARATUS, COMPUTER DEVICE, AND STORAGE MEDIUM

(71) Applicant: TENCENT TECHNOLOGY (SHENZHEN) COMPANY LIMITED, Shenzhen (CN)

(72) Inventors: Yong Yang, Shenzhen (CN); Haining Du, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 364 days.

(21) Appl. No.: 18/079,249

(22) Filed: Dec. 12, 2022

(65) Prior Publication Data
US 2023/0115110 A1 Apr. 13, 2023

Related U.S. Application Data

(63) Continuation of application No. PCT/CN2022/079964, filed on Mar. 9, 2022.

(30) Foreign Application Priority Data

Apr. 19, 2021 (CN) .......................... 202110416217.0

(51) Int. Cl.
G08G 1/01 (2006.01)
G06F 30/20 (2020.01)
(52) U.S. Cl.
CPC ........... G08G 1/0129 (2013.01); G06F 30/20 (2020.01)
(58) Field of Classification Search
None
See application file for complete search history.

(56) References Cited

U.S. PATENT DOCUMENTS

2004/0088392 A1* 5/2004 Barrett ................. G08G 1/0104
709/223
2009/0043486 A1* 2/2009 Yang ................... G01C 21/3492
701/117

(Continued)

FOREIGN PATENT DOCUMENTS

| CN | 103412975 A | * 11/2013 | |
| CN | 110570660 A | * 12/2019 | ........... G06Q 10/047 |

(Continued)

OTHER PUBLICATIONS

Fan, Haoyang et al., "An Auto-tuning Framework for Autonomous Vehicles," Aug. 14, 2018, ArXiv (Year: 2018).*

(Continued)

*Primary Examiner* — Madison R. Inserra
(74) *Attorney, Agent, or Firm* — Anova Law Group, PLLC

(57) ABSTRACT

A traffic simulation method includes: performing mesoscopic traffic simulation on a target vehicle corresponding to a target trip matrix in a current time period based on starting mesoscopic simulated traffic condition data corresponding to the current time period and a simulation requirement to obtain target travel data of the target vehicle in the current time period, the starting mesoscopic simulated traffic condition data being determined according to real-time microscopic simulated traffic condition data in a previous time period corresponding to the current time period; and performing microscopic traffic simulation on a traveling vehicle in a simulated road network corresponding to the starting mesoscopic simulated traffic condition data based on the target travel data to obtain real-time microscopic simulated traffic condition data corresponding to the current time period, which is used for obtaining a simulated traffic (Continued)

condition corresponding to the simulation requirement in the current time period.

16 Claims, 12 Drawing Sheets

(56) References Cited

U.S. PATENT DOCUMENTS

2012/0095740 A1    4/2012  Kitagawa et al.
2021/0053572 A1*  2/2021  Vasoya ................ B60W 40/04

FOREIGN PATENT DOCUMENTS

| CN | 111008450 A | | 4/2020 | | |
|----|-------------|---|--------|---|---|
| CN | 111866132 A | * | 10/2020 | ........... | G08G 1/0104 |
| CN | 111881557 A | | 11/2020 | | |
| CN | 112818497 A | | 5/2021 | | |
| WO | WO-2018142194 A1 | * | 8/2018 | ............... | G06N 7/08 |

OTHER PUBLICATIONS

The World Intellectual Property Organization (WIPO) International Search Report for PCT/CN2022/079964 May 11, 2022 6 Pages (including translation).

* cited by examiner

TRAFFIC SIMULATION METHOD AND APPARATUS, COMPUTER DEVICE, AND STORAGE MEDIUM

CROSS-REFERENCES TO RELATED APPLICATIONS

This application is a continuation application of PCT Patent Application No. PCT/CN2022/079964, filed on Mar. 9, 2022, which claims priority to Chinese Patent Application No. 202110416217.0, entitled "TRAFFIC SIMULATION METHOD AND APPARATUS, COMPUTER DEVICE, AND STORAGE MEDIUM" filed with the China National Intellectual Property Administration on Apr. 19, 2021, the entire contents of both of which are incorporated herein by reference.

FIELD OF THE TECHNOLOGY

The present disclosure relates to the field of computer technologies, and in particular, to a traffic simulation method and apparatus, a computer device, and a storage medium.

BACKGROUND OF THE DISCLOSURE

With the development of computer technologies, traffic simulation technology has emerged. Traffic simulation refers to studying traffic behaviors by use of a simulation technology, and is a technology for tracking and describing changes of traffic movement with time and space.

In the related art, traffic simulation is run by batch cycle in time windows of a certain granularity. When next simulation is started, simulation vehicles that are still in transit currently are emptied, and then simulation is restarted based on a latest traffic OD matrix, which eventually leads to the discontinuity of flashing and disappearance of vehicles in transition of two adjacent batches of simulation.

SUMMARY

Various embodiments of the present disclosure provide a traffic simulation method and apparatus, a computer device, and a storage medium.

A traffic simulation method is provided, performed by a computer device, the method including: obtaining a target trip matrix corresponding to a current time period, the target trip matrix describing trip information in the current time period; performing mesoscopic traffic simulation on a target vehicle corresponding to the target trip matrix based on starting mesoscopic simulated traffic condition data corresponding to the current time period and a simulation requirement to obtain target travel data of the target vehicle in the current time period, the starting mesoscopic simulated traffic condition data being determined according to real-time microscopic simulated traffic condition data in a previous time period corresponding to the current time period, the mesoscopic traffic simulation being traffic simulation directed to vehicle groups, and the mesoscopic traffic simulation being used for assigning a target travel path corresponding to the simulation requirement to the target vehicle; and performing microscopic traffic simulation on a traveling vehicle in a simulated road network corresponding to the starting mesoscopic simulated traffic condition data based on the target travel data to obtain real-time microscopic simulated traffic condition data corresponding to the current time period, the real-time microscopic simulated traffic condition data being used for obtaining a simulated traffic condition corresponding to the simulation requirement in the current time period, and microscopic traffic simulation being traffic simulation directed to vehicle individuals.

A traffic simulation apparatus is provided, including: a target trip matrix obtaining module, configured to obtain a target trip matrix corresponding to a current time period, the target trip matrix describing trip information in the current time period; a mesoscopic traffic simulation module, configured to perform mesoscopic traffic simulation on a target vehicle corresponding to the target trip matrix based on starting mesoscopic simulated traffic condition data corresponding to the current time period and a simulation requirement to obtain target travel data of the target vehicle in the current time period, the starting mesoscopic simulated traffic condition data being determined according to real-time microscopic simulated traffic condition data in a previous time period corresponding to the current time period, mesoscopic traffic simulation being traffic simulation directed to vehicle groups, and mesoscopic traffic simulation being used for assigning a target travel path corresponding to the simulation requirement to the target vehicle; and a microscopic traffic simulation module, configured to perform microscopic traffic simulation on a traveling vehicle in a simulated road network corresponding to the starting mesoscopic simulated traffic condition data based on the target travel data to obtain real-time microscopic simulated traffic condition data corresponding to the current time period, the real-time microscopic simulated traffic condition data being used for obtaining a simulated traffic condition corresponding to the simulation requirement in the current time period, and microscopic traffic simulation being traffic simulation directed to vehicle individuals.

A traffic simulation system is provided, including: a mesoscopic simulation server, configured to obtain a target trip matrix corresponding to a current time period, the target trip matrix describing trip information in the current time period, and perform mesoscopic traffic simulation on a target vehicle corresponding to the target trip matrix based on starting mesoscopic simulated traffic condition data corresponding to the current time period and a simulation requirement to obtain target travel data of the target vehicle in the current time period, the starting mesoscopic simulated traffic condition data being determined by a microscopic simulation server according to real-time microscopic simulated traffic condition data in a previous time period corresponding to the current time period and transmitted to the mesoscopic simulation server, mesoscopic traffic simulation being traffic simulation directed to vehicle groups, and mesoscopic traffic simulation being used for assigning a target travel path corresponding to the simulation requirement to the target vehicle; and the microscopic simulation server, configured to receive the target travel data transmitted by the mesoscopic simulation server, and perform microscopic traffic simulation on a traveling vehicle in a simulated road network corresponding to the starting mesoscopic simulated traffic condition data based on the target travel data to obtain real-time microscopic simulated traffic condition data corresponding to the current time period, the real-time microscopic simulated traffic condition data being used for obtaining a simulated traffic condition corresponding to the simulation requirement in the current time period, and microscopic traffic simulation being traffic simulation directed to vehicle individuals.

A computer device is provided, including a memory and one or more processors, the memory storing computer-readable instructions, and when the computer-readable instruction, when being executed by the one or more processors, causing the one or more processors to perform the operations of the foregoing traffic simulation method.

One or more non-transitory computer-readable storage media are provided, storing computer-readable instructions, the computer-readable instructions, when executed by one or more processors, causing the one or more processors to perform the operations of the foregoing traffic simulation method.

Details of one or more embodiments of the present disclosure are provided in the accompanying drawings and descriptions below. Other features, objectives, and advantages of the present disclosure become apparent from the specification, the drawings, and the claims.

BRIEF DESCRIPTION OF THE DRAWINGS

To describe the technical solutions in the embodiments of the present disclosure more clearly, the following briefly introduces the accompanying drawings required for describing the embodiments. Apparently, the accompanying drawings in the following description show only some embodiments of the present disclosure, and a person of ordinary skill in the art may still derive other accompanying drawings from these accompanying drawings without creative efforts.

DESCRIPTION OF EMBODIMENTS

To make the objectives, technical solutions, and advantages of the present disclosure clearer, the following further describes the present disclosure in detail with reference to the accompanying drawings and the embodiments. It is to be understood that the specific embodiments described herein are only used for explaining the present disclosure, and are not used for limiting the present disclosure.

Figure 1:
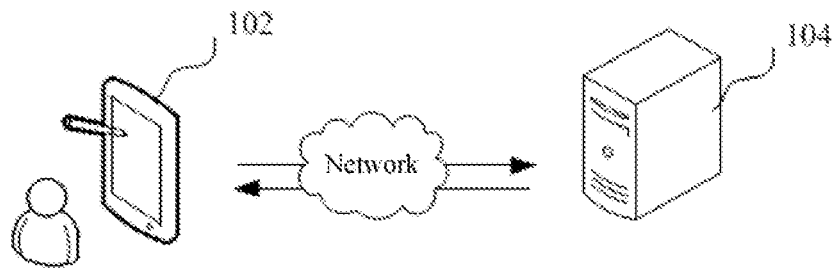
FIG. 1 is a diagram of an application environment of a traffic simulation method according to an embodiment.

A traffic simulation method provided in the present disclosure may be applicable to an application environment shown in FIG. 1. A terminal 102 communicates with a server 104 through a network. The terminal 102 may be, but not limited to, a desktop computer, a notebook computer, a smartphone, a tablet computer, an in-vehicle terminal, and a portable wearable device. The server 104 may be implemented by an independent server, a server cluster including a plurality of servers, or a cloud server.

Both the terminal 102 and the server 104 may be configured independently to perform the traffic simulation method provided in the embodiments of the present disclosure.

For example, the server obtains a target trip matrix corresponding to a current time period, the target trip matrix describing trip information in the current time period, and performs mesoscopic traffic simulation on a target vehicle corresponding to the target trip matrix based on starting mesoscopic simulated traffic condition data corresponding to the current time period and a simulation requirement to obtain target travel data of the target vehicle in the current time period, the starting mesoscopic simulated traffic condition data being determined according to real-time microscopic simulated traffic condition data in a previous time period corresponding to the current time period, mesoscopic traffic simulation being traffic simulation directed to vehicle groups, and mesoscopic traffic simulation being used for assigning a target travel path corresponding to the simulation requirement to the target vehicle. The server performs microscopic traffic simulation on a traveling vehicle in a simulated road network corresponding to the starting mesoscopic simulated traffic condition data based on the target travel data to obtain real-time microscopic simulated traffic condition data corresponding to the current time period, the real-time microscopic simulated traffic condition data being used for obtaining a simulated traffic condition corresponding to the simulation requirement in the current time period, and microscopic traffic simulation being traffic simulation directed to vehicle individuals.

Both the terminal 102 and the server 104 may be alternatively used in cooperation to perform the traffic simulation method provided in the embodiments of the present disclosure.

For example, the server obtains a target trip matrix corresponding to a current time period, the target trip matrix describing trip information in the current time period. The server performs mesoscopic traffic simulation on a target vehicle corresponding to the target trip matrix based on starting mesoscopic simulated traffic condition data corresponding to the current time period and a simulation requirement to obtain target travel data of the target vehicle in the current time period, the starting mesoscopic simulated traffic condition data being determined according to real-time microscopic simulated traffic condition data in a previous time period corresponding to the current time period, mesoscopic traffic simulation being traffic simulation directed to vehicle groups, and mesoscopic traffic simulation being used for assigning a target travel path corresponding to the simulation requirement to the target vehicle. The server performs microscopic traffic simulation on a traveling vehicle in a simulated road network corresponding to the starting mesoscopic simulated traffic condition data based on the target travel data to obtain real-time microscopic simulated traffic condition data corresponding to the current time period, the real-time microscopic simulated traffic condition data being used for obtaining a simulated traffic condition corresponding to the simulation requirement in the current time period, and microscopic traffic simulation being traffic simulation directed to vehicle individuals. The server may transmit the real-time microscopic simulated traffic condition data corresponding to the current time period to the terminal such that the terminal performs rendering to display the simulated traffic condition corresponding to the simulation requirement in the current time period.

According to the traffic simulation method, the starting mesoscopic simulated traffic condition data corresponding to the current time period is determined according to the real-time microscopic simulated traffic condition data in the previous time period corresponding to the current time period, so that smooth transition may be ensured during switching of two adjacent batches of simulation, the continuity of traffic simulation may be ensured, and flashing of vehicles may be avoided. In addition, mesoscopic traffic simulation is performed first from the perspective of vehicle group to obtain the target travel data of the target vehicle in the current time period rapidly, and then more detailed microscopic traffic simulation is performed from the perspective of vehicle individual to obtain the real-time microscopic simulated traffic condition data corresponding to the current time period. The dynamic integration of mesoscopic traffic simulation and microscopic traffic simulation may obtain the simulated traffic condition in the current time period rapidly and accurately.

Figure 2:
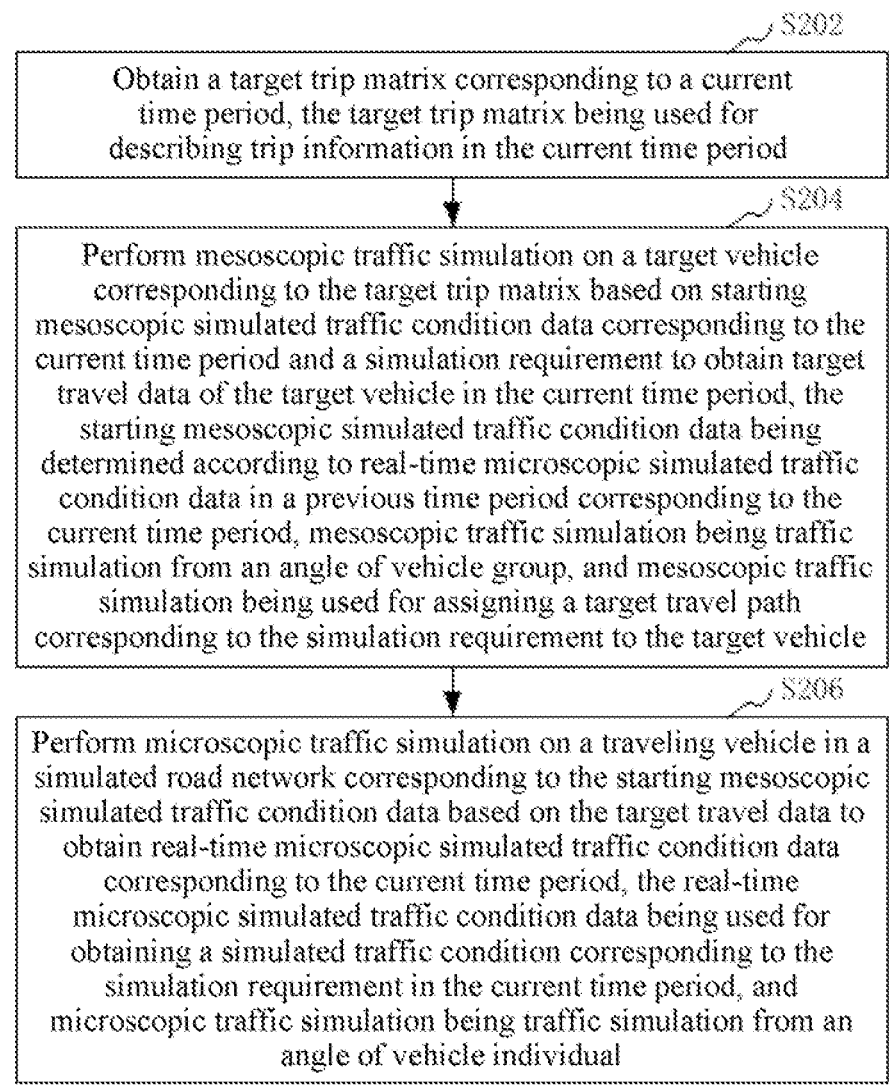
FIG. 2 is a schematic flowchart of a traffic simulation method according to an embodiment.

In an embodiment, as shown in FIG. 2, a traffic simulation method is provided, which is described with application to a computer device in FIG. 1 as an example. The computer device may be the terminal 102 or server 104 in FIG. 1. Referring to FIG. 2, the traffic simulation method includes the following steps:

Step S202: Obtain a target trip matrix corresponding to a current time period, the target trip matrix describing trip information in the current time period.

The current time period may be a period of time including a current moment, or a period of time before the current moment, or a period of time after the current moment. The trip matrix is used for describing trip information, which refers to traffic information generated when a vehicle travels from an origin to a destination. The trip information may include the origin, the destination, a travel path from the origin to the destination, a traffic flow from the origin to the destination, departure time, and other information. The target trip matrix refers to a trip matrix corresponding to the current time period. The trip matrix may also be referred to as an origin destination (OD) matrix.

Specifically, the computer device may obtain the target trip matrix corresponding to the current time period locally or from another terminal and server to further simulate a traffic condition corresponding to the current time period.

In an embodiment, the target trip matrix corresponding to the current time period may be predicted based on historical traffic data before the current time period, so as to predict the traffic condition in the current time period based on the target trip matrix. Predicting future traffic phenomena based on historical traffic data may help cities construct traffic early warning. Specifically, a historical trip matrix is generated based on historical traffic data, and the target trip matrix corresponding to the current time period is predicted based on the historical trip matrix. Alternatively, the target trip matrix corresponding to the current time period is generated based on actual traffic data in the current time period, and the traffic condition in the current time period is reproduced based on the target trip matrix corresponding to the current time period. Alternatively, a preset trip matrix is obtained and determined as the target trip matrix corresponding to the current time period, and a traffic condition reflected by the preset trip matrix is simulated based on the target trip matrix corresponding to the current time period. The preset trip matrix may be set artificially or generated randomly. In addition, the target trip matrix may be a trip matrix corresponding to a target region, and the target trip matrix corresponding to the target region in the current time period is generated based on traffic data corresponding to the target region. Generation of the trip matrix based on the traffic data may specifically be implemented by performing trip analysis on vehicle trajectory data in the traffic data to obtain an initial matrix, and adjusting the initial matrix based on traffic flow data in the traffic data to obtain the trip matrix.

Step S204: Perform mesoscopic traffic simulation on a target vehicle corresponding to the target trip matrix based on starting mesoscopic simulated traffic condition data corresponding to the current time period and a simulation requirement to obtain target travel data of the target vehicle in the current time period, the starting mesoscopic simulated traffic condition data being determined according to real-time microscopic simulated traffic condition data in a previous time period corresponding to the current time period, mesoscopic traffic simulation being traffic simulation directed to vehicle groups, and mesoscopic traffic simulation being used for assigning a target travel path corresponding to the simulation requirement to the target vehicle.

Mesoscopic traffic simulation is traffic simulation directed to vehicle groups, i.e., traffic simulation with a vehicle group as a study object, mainly focusing on the overall impact of the vehicle group on traffic. In an embodiment, mesoscopic traffic simulation is a traffic simulation technology that performs minute-level approximation processing on lane changing, turning, and other behaviors of a vehicle based on a queue model.

The mesoscopic simulated traffic condition data is traffic condition data generated based on mesoscopic traffic simulation. The mesoscopic simulated traffic condition data may specifically include information such as a travel path of a vehicle, an origin, and a destination. The starting mesoscopic simulated traffic condition data refers to mesoscopic simulated traffic condition data corresponding to a starting moment of the current time period. The starting mesoscopic simulated traffic condition data is determined according to real-time microscopic simulated traffic condition data in a previous time period corresponding to the current time period. There is an overlapping moment between the current time period and the previous time period corresponding to the current time period. Therefore, microscopic simulated traffic condition data corresponding to the starting moment of the current time period may be determined from the real-time microscopic simulated traffic condition data in the previous time period corresponding to the current time period, and then the mesoscopic simulated traffic condition data corresponding to the starting moment of the current time period is determined based on the microscopic simulated traffic condition data corresponding to the starting moment of the current time period.

Microscopic traffic simulation is traffic simulation with a vehicle individual as a view angle, i.e., traffic simulation with a vehicle individual as a study object, mainly focusing on the detailed impact of a single vehicle on traffic. In an embodiment, microscopic traffic simulation is a simulation technology that implements millisecond-level fine presentation of overtaking, following, lane changing, and other behaviors from an angle of single vehicle.

The microscopic simulated traffic condition data is traffic condition data generated based on microscopic traffic simulation. The microscopic simulated traffic condition data may specifically include information such as a travel path of a vehicle, an origin, a designation, a position and state of the vehicle at each moment, and a road surrounding environment. It can be understood that, in the same time period, microscopic simulated traffic condition data has a larger size than mesoscopic simulated traffic condition data, and includes more detailed information, such as a road surrounding environment. The microscopic simulated traffic condition data is more suitable for rendering display. The real-time microscopic simulated traffic condition data includes microscopic simulated traffic condition data corresponding to each moment in a time period.

The simulation requirement refers to a simulation target. The simulation requirement may specifically include at least one of traffic reproduction, vehicle balancing, system optimization, etc. It can be understood that different traffic conditions may be simulated based on different simulation targets for the same target trip matrix. The simulation requirement may be set as actually required. For example, the computer device may receive a traffic simulation request containing the simulation requirement, and perform traffic simulation based on the simulation requirement in response to the traffic simulation request. The traffic simulation request may be triggered to be generated on a relevant interface.

The target trip matrix is used for describing trip information in the current time period, and includes a target traffic flow in the current time period. The target vehicle may be determined according to the target traffic flow. For example, if the target traffic flow is 100, 100 target vehicles may be generated accordingly. Target travel data includes data of the target vehicle in a simulated road network in the current time period, such as an origin, a destination, a travel path, time spent on the whole trip, and average time spent on each road.

Specifically, the computer device may perform traffic simulation by batch cycle in time windows of a certain granularity. Before starting traffic simulation in the current time period, the computer device may obtain real-time microscopic simulated traffic condition data in a previous time period corresponding to the current time period, and determines starting mesoscopic simulated traffic condition data corresponding to the current time period from the real-time microscopic simulated traffic condition data in the previous time period. For example, the computer device performs simulation every 15 minutes. Simulation is performed at 8:00 to obtain real-time microscopic simulated traffic condition data corresponding to 8:00 to 8:15, simulation is performed at 8:15 to obtain real-time microscopic simulated traffic condition data corresponding to 8:15 to 8:30, and simulation is performed at 8:30 to obtain real-time microscopic simulated traffic condition data corresponding to 8:30 to 8:45. Before starting traffic simulation at 8:15, the computer device may obtain microscopic simulated traffic condition data corresponding to 8:15 from the real-time microscopic simulated traffic condition data corresponding to 8:00 to 8:15, generate mesoscopic simulated traffic condition data corresponding to 8:15 based on the microscopic simulated traffic condition data corresponding to 8:15, and determine the mesoscopic simulated traffic condition data corresponding to 8:15 as starting mesoscopic simulated traffic condition data in the time period of 8:15 to 8:30.

The computer device may further perform mesoscopic traffic simulation on a target vehicle corresponding to the target trip matrix based on the starting mesoscopic simulated traffic condition data corresponding to the current time period and a simulation requirement to obtain target travel data of the target vehicle in the current time period. During mesoscopic traffic simulation, the computer device may perform travel path assignment on the target vehicle based on the simulation requirement to obtain a target travel path of the target vehicle matched with the simulation requirement in the current time period, so as to obtain the target travel data of the target vehicle in the current time period based on the target travel path of the target vehicle in the current time period. The computer device may set reference travel data corresponding to different simulation requirements. If simulated travel data generated by traveling of the target vehicle in the simulated road network according to a travel path assigned by the computer device reaches or is close to the reference travel data, the computer device may determine the travel path as the target travel path of the target vehicle. If the simulated travel data differs greatly from the reference travel data, the computer device may assign a new travel path to the target vehicle. For example, when the simulation requirement is traffic reproduction, the computer device may set the reference travel data to an actual traffic flow and actual travel speed in a real road network, and when a simulated traffic flow and simulated travel speed in the simulated road network differ slightly from the actual traffic flow and actual travel speed in the real road network, it may be considered that a traffic condition in the real road network is reproduced in the current simulated road network.

It can be understood that, during mesoscopic traffic simulation, data with relatively low impact on traveling of a whole vehicle, such as the road surrounding environment, a distance between adjacent intersections, and lane changing and turning of the vehicle, may be approximated, to accelerate simulation. For example, the distance between adjacent intersections may be represented by a distance between a zebra crossing and traffic lights. In mesoscopic traffic simulation, a travel behavior of the target vehicle between the zebra crossing and the traffic lights is ignorable, and when the green light is on, the target vehicle directly travels from the end of the previous intersection to the start of the next intersection. As such, the amount of simulation data is reduced, and simulation is accelerated.

In an embodiment, the computer device may perform mesoscopic traffic simulation on a target vehicle corresponding to the target trip matrix based on starting mesoscopic simulated traffic condition data corresponding to the current time period and a simulation requirement to obtain candidate travel data of the target vehicle in a target time period including the current time period, and determines target travel data of the target vehicle in the current time period based on the candidate travel data. For example, the computer device performs simulation every 15 minutes. Simulation is performed at 8:00: mesoscopic traffic simulation is performed first to obtain candidate travel data of the target vehicle from 8:00 to 8:30, travel data of the target vehicle from 8:00 to 8:15 is obtained from the candidate travel data of the target vehicle from 8:00 to 8:30 as target travel data of the target vehicle from 8:00 to 8:15, and then microscopic traffic simulation is performed to finely present a simulated traffic condition. It can be understood that mesoscopic traffic simulation is from the perspective of vehicle group. In order to simulate a traffic condition matched with the simulation requirement more accurately, it is necessary to comprehensively consider whole-trip travel data of all target vehicles from origins to destinations in the simulated road network. Moreover, departure time of different target vehicles is different. Therefore, during mesoscopic traffic simulation, the candidate travel data of the target vehicle in the target time period is obtained first, and then the target travel data of the target vehicle in the current time period is obtained from the candidate travel data in the target time period. A time length of the target time period is greater than or equal to that of the current time period. The target time period includes the current time period.

Step S206: Perform microscopic traffic simulation on a traveling vehicle in a simulated road network corresponding to the starting mesoscopic simulated traffic condition data based on the target travel data to obtain real-time microscopic simulated traffic condition data corresponding to the current time period, the real-time microscopic simulated traffic condition data being used for obtaining a simulated traffic condition corresponding to the simulation requirement in the current time period, and microscopic traffic simulation being traffic simulation directed to vehicle individuals.

The traveling vehicle in the simulated road network refers to a vehicle traveling in the simulated road network in the current time period, including a target vehicle that needs to join the simulated road network and a historical vehicle that is still traveling in the simulated road network and yet does not arrive at a destination. The simulated traffic condition refers to traffic condition information obtained by traffic simulation. The simulated traffic condition may specifically include a congestion ratio, an average speed, a traffic flow, and other information.

Specifically, after obtaining the target travel data of the target vehicle in the current time period by mesoscopic traffic simulation, the computer device may perform microscopic traffic simulation on a traveling vehicle in a simulated road network corresponding to the starting mesoscopic simulated traffic condition data based on the target travel data to enable the target vehicle to travel in the simulated road network according to the target travel data and enable, based on dynamic travel impact between the target vehicle and a historical vehicle, the traveling vehicle in the simulated road network to steadily travel to a corresponding destination, to obtain real-time microscopic simulated traffic condition data corresponding to the current time period based on a travel process of each traveling vehicle in the simulated road network. The real-time microscopic simulated traffic condition data is used for obtaining a simulated traffic corresponding to the simulation requirement in the current time period. The computer device may perform rendering display on the real-time microscopic simulated traffic condition data, so as to visually display the simulated traffic condition corresponding to the simulation requirement in the current time period. An urban traffic manager may perform traffic decision-making, control, and planning based on the visual simulated traffic condition. For example, in case of road congestion, measures, such as a traffic guidance screen and additional traffic management and control, are taken on a congested segment to alleviate the road congestion.

In an embodiment, during microscopic traffic simulation, a virtual microscopic autonomous driving model may be used. One traveling vehicle in the simulated road network corresponds to one microscopic autonomous driving model. Through the microscopic autonomous driving model, each traveling vehicle perceives a surrounding traffic environment, processes data, and rapidly makes a decision in response. Therefore, each traveling vehicle may autonomously travel from an origin gradually to a destination according to a target travel path.

In an embodiment, if there are multiple simulation requirements, the computer device may finally display simulated videos respectively corresponding to the various simulation requirements at the same time in a split-screen manner, which is more conducive to traffic early warning and planning and facilitates planned scheduling of traffic police and decision-making.

According to the traffic simulation method, the target trip matrix corresponding to the current time period is obtained, the target trip matrix describing trip information in the current time period. Mesoscopic traffic simulation is performed on the target vehicle corresponding to the target trip matrix based on the starting mesoscopic simulated traffic condition data corresponding to the current time period and the simulation requirement to obtain the target travel data of the target vehicle in the current time period, the starting mesoscopic simulated traffic condition data being determined according to the real-time microscopic simulated traffic condition data in the previous time period corresponding to the current time period, mesoscopic traffic simulation being traffic simulation from the perspective of vehicle group, and mesoscopic traffic simulation being used for assigning the target travel path corresponding to the simulation requirement to the target vehicle. Microscopic traffic simulation is performed on the traveling vehicle in the simulated road network corresponding to the starting mesoscopic simulated traffic condition data based on the target travel data to obtain the real-time microscopic simulated traffic condition data corresponding to the current time period, the real-time microscopic simulated traffic condition data being used for obtaining the simulated traffic condition corresponding to the simulation requirement in the current time period, and microscopic traffic simulation being traffic simulation from the perspective of vehicle individual. In this manner, the starting mesoscopic simulated traffic condition data corresponding to the current time period is determined according to the real-time microscopic simulated traffic condition data in the previous time period corresponding to the current time period, so that smooth transition may be ensured during switching of two adjacent batches of simulation, and flashing of vehicles may be avoided. In addition, mesoscopic traffic simulation is performed first from the perspective of vehicle group to obtain the target travel data of the target vehicle in the current time period rapidly, and then more detailed microscopic traffic simulation is performed from the perspective of vehicle individual to obtain the real-time microscopic simulated traffic condition data corresponding to the current time period. The dynamic integration of mesoscopic traffic simulation and microscopic traffic simulation may obtain the simulated traffic condition in the current time period rapidly and accurately.

Figure 3:
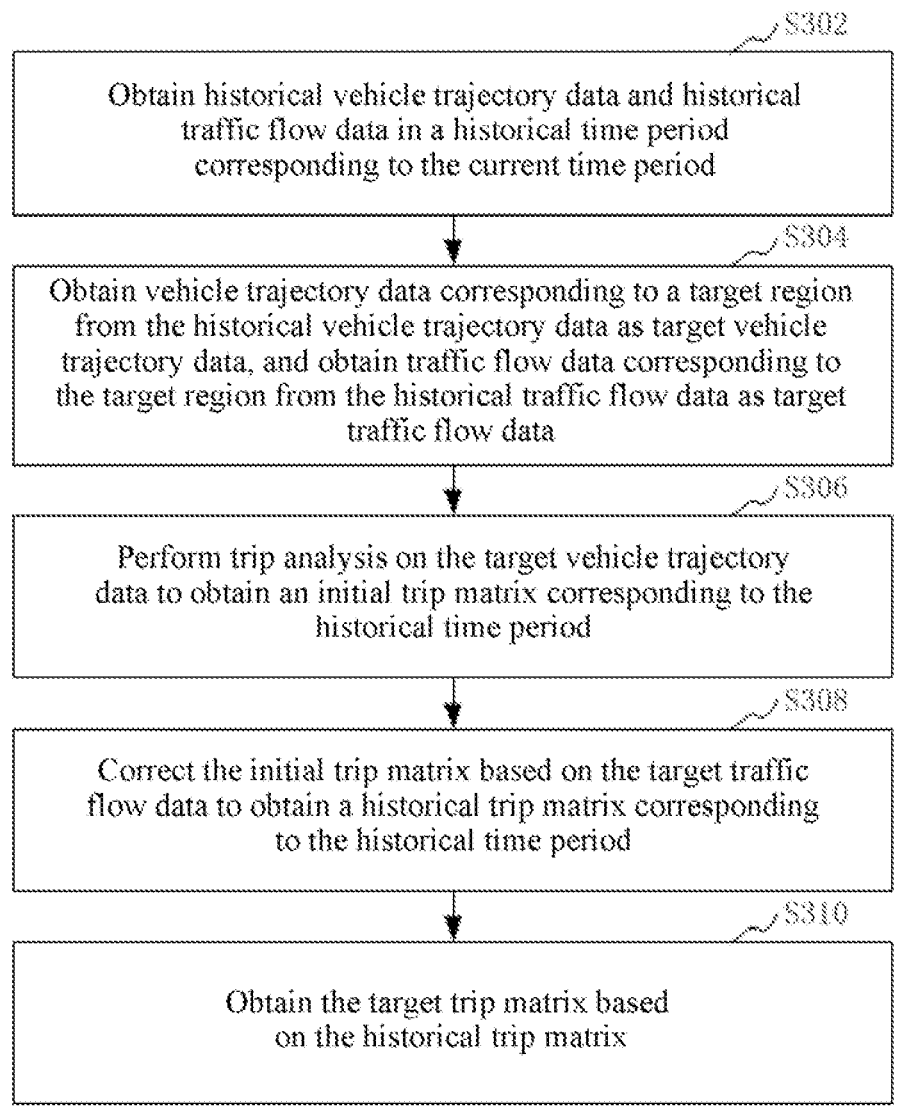
FIG. 3 is a schematic flowchart of obtaining a target trip matrix corresponding to a current time period according to an embodiment.

In an embodiment, as shown in FIG. 3, the operation of obtaining a target trip matrix corresponding to a current time period includes the following steps:

Step S302: Obtain historical vehicle trajectory data and historical traffic flow data in a historical time period corresponding to the current time period.

The historical time period corresponding to the current time period refers to any time period before the current time period. There may be multiple historical time periods corresponding to the current time period. Time lengths of the current time period and the historical time period may be the same or different. The historical vehicle trajectory data refers to vehicle trajectory data obtained statistically in the historical time period. The historical traffic flow data refers to traffic flow data obtained statistically in the historical time period. For example, the current time period is 8:00 to 8:15, the historical time period corresponding to the current time period may be 7:45 to 8:00, the historical vehicle trajectory data may be vehicle trajectory data obtained statistically from 7:45 to 8:00, and the historical traffic flow data may be traffic flow data obtained statistically from 7:45 to 8:00.

Specifically, the computer device may perform fusion analysis on multi-source data such as an urban vehicle trajectory flow, mobile signaling, and checkpoint data to mine a trip requirement, so as to generate a historical trip matrix and further predict the target trip matrix corresponding to the current time period based on the historical trip matrix corresponding to the historical time period. The computer device may obtain vehicle trajectory data of a private vehicle, a taxi, an on-line hailed vehicle, a bus, and other vehicles in the historical time period from a first terminal and a first server as historical vehicle trajectory data. The computer device may obtain traffic section flow data, such as checkpoint data and geomagnetic coil data, and mobile signaling data of each segment in the historical time period from a second terminal and a second server as historical traffic flow data. The first terminal may be a user terminal. The first server may be servers corresponding to various mobile APPs, such as a server corresponding to a navigation application and a server corresponding to a car-hailing application. Social APPs, map navigation APPs, and other APPs installed on various mobile devices may obtain super-large-scale user positioning information while meeting security and privacy requirements. A real movement trajectory of each user may be reproduced according to positioning of each user. Then, a trip requirement is analyzed to mine an origin and destination of the user. The second terminal may be a traffic police device, such as various sensors arranged by the road. The second server may be a data statistics server for traffic police to use. A ferromagnetic substance contained in the vehicle may affect a geomagnetic signal in a region where the vehicle is to bend an earth magnetic line of force in the region where the vehicle is. Based on this, when the vehicle passes near the sensor, the sensor may sensitively perceive a change of the geomagnetic signal, and a traffic facility corresponding to the detection target may be obtained by signal analysis, so as to statistically obtain a traffic flow passing through a specific road cross section based on the geomagnetic coil data. The mobile signaling refers to the same user trajectory information captured and recorded by a communication base station of an operating company (Mobile, Unicom, Telecom, etc.) in case of a call, short message sending, movement, etc., of the user. When the signaling data is obtained, namely the user position and trajectory are obtained, a traffic requirement is analyzed according to the user position and trajectory, a pedestrian flow is determined, and the traffic flow is further determined based on the pedestrian flow.

Step S304: Obtain vehicle trajectory data corresponding to a target region from the historical vehicle trajectory data as target vehicle trajectory data, and obtain traffic flow data corresponding to the target region from the historical traffic flow data as target traffic flow data.

Specifically, the computer device may further screen the historical vehicle trajectory data and the historical traffic flow data to obtain vehicle trajectory data in a target region as target vehicle trajectory data and traffic flow data in the target region as target traffic flow data. That is, the computer device obtains the vehicle trajectory data corresponding to the target region from the historical vehicle trajectory data as the target vehicle trajectory data, and obtains the traffic flow data corresponding to the target region from the historical traffic flow data as the target traffic flow data. For example, vehicle trajectory data corresponding to city A is obtained from the historical vehicle trajectory data as target vehicle trajectory data, traffic flow data corresponding to city A is obtained from the historical traffic flow data as target traffic flow data, a historical trip matrix corresponding to city A in the historical time period is generated based on the target vehicle trajectory data and the target traffic flow data, and a target trip matrix corresponding to city A in the current time period is generated based on the historical trip matrix, so as to simulate a traffic condition of city A in the current time period based on the target trip matrix.

Step S306: Perform trip analysis on the target vehicle trajectory data to obtain an initial trip matrix corresponding to the historical time period.

Step S308: Adjust the initial trip matrix based on the target traffic flow data to obtain a historical trip matrix corresponding to the historical time period.

Travel analysis is used for mining trip information from vehicle trajectory data. The initial trip matrix is used for describing local historical trip information. The historical trip matrix is used for describing the complete historical trip information.

Specifically, after obtaining the target vehicle trajectory data and the target traffic flow data, the computer device may perform trip analysis on the target vehicle trajectory data to obtain a trip trajectory, origin, and destination of a vehicle by segmentation to obtain an initial trip matrix. It is difficult to obtain trajectory information of all vehicles, and the target vehicle trajectory data may reflect trajectory information of only part of vehicles, the initial trip matrix is only for describing local historical trip information. In order to improve the accuracy and reliability of a historical trip matrix, the computer device may adjust the initial trip matrix based on the target traffic flow data to obtain a historical trip matrix for describing complete historical trip information. The target traffic flow data is determined based on data reflecting the traffic flow, such as a geomagnetic coil and a checkpoint, and reflecting the pedestrian flow, such as mobile signaling, and may reflect flow information of all vehicles. Therefore, the target trip matrix obtained by adjusting the initial trip matrix based on the target traffic flow data may describe the complete historical trip information.

Step S310: Obtain the target trip matrix based on the historical trip matrix.

Specifically, the computer device may obtain the target trip matrix based on the historical trip matrix, namely predicting the target trip matrix according to the historical trip matrix. The computer device may merge multiple historical trip matrices to obtain the target trip matrix. For example, it is assumed that a current moment in a real road network is 8:00 on Monday, actual traffic data after 8:00 is yet not generated, and the current time period is 8:00 to 8:15 on Monday. In such case, the computer device may obtain target vehicle trajectory data and target traffic flow data from 7:45 to 8:00 on Monday to generate a historical trip matrix A from 7:45 to 8:00 on Monday, obtain target vehicle trajectory data and target traffic flow data from 8:00 to 8:15 last week to generate a historical trip matrix B in 8:00 to 8:15 last week, and generate a target trip matrix corresponding to the current time period based on the historical trip matrix A and the historical trip matrix B. Merging the multiple historical trip matrices may specifically be performing, taking an origin-destination (OD) pair in the historical trip matrix as an OD pair in the target trip matrix, weighted summation on estimated traffic flows corresponding to the same OD pair (i.e., the same origin and destination) in the respective historical trip matrices to obtain a target traffic flow corresponding to the OD pair in the target trip matrix.

In this embodiment, the historical vehicle trajectory data and historical traffic flow data in the historical time period corresponding to the current time period are obtained, the vehicle trajectory data corresponding to the target region is obtained from the historical vehicle trajectory data as the target vehicle trajectory data, the traffic flow data corresponding to the target region is obtained from the historical traffic flow data as the target traffic flow data, trip analysis is performed on the target vehicle trajectory data to obtain the initial trip matrix corresponding to the historical time period, and the initial trip matrix is adjusted based on the target traffic flow data to obtain the historical trip matrix corresponding to the historical time period, so that a traffic OD matrix closest to the reality may be obtained. Further, the target trip matrix is obtained based on the historical trip matrix, so that a future traffic OD matrix may be predicted accurately and reliably.

In an embodiment, the operation of performing trip analysis on the target vehicle trajectory data to obtain an initial trip matrix corresponding to the historical time period includes:

performing trajectory segmentation on the target vehicle trajectory data to obtain candidate travel paths respectively corresponding to multiple candidate vehicles, the candidate travel path including a candidate origin and a candidate destination; performing origin clustering and destination clustering on each candidate travel path based on a reference point of interest to obtain an intermediate origin and intermediate destination corresponding to each candidate travel path; clustering the candidate travel paths corresponding to the same intermediate origin and intermediate destination to obtain multiple target trip combinations, and obtaining a number of the candidate vehicles corresponding to the same target trip combination statistically to obtain an initial traffic flow corresponding to each target trip combination, the target trip combination including at least one candidate travel path corresponding to the same intermediate origin and intermediate destination; and generating the initial trip matrix based on each target trip combination and the corresponding initial traffic flow and candidate travel path.

The reference point of interest refers to a landmark geographic position in the real road network, such as a shopping mall, a hotel, a hospital, a station, an office building, a gas station, and a residential area.

Specifically, the computer device may first perform trajectory segmentation on the target vehicle trajectory data to obtain candidate travel paths respectively corresponding to multiple candidate vehicles, each candidate travel path including a candidate origin and a candidate destination. For example, one vehicle trajectory corresponds to one candidate vehicle. If the historical time period includes travel time corresponding to a vehicle trajectory, the vehicle trajectory is determined as a candidate travel path, whose origin is determined as a candidate origin while destination is determined as a candidate destination. If a length of travel time corresponding to a vehicle trajectory is greater than that of the historical time period, and a starting moment is within the historical time period, the vehicle trajectory is segmented with the trajectory beyond the historical time period discarded to obtain a target vehicle trajectory, and the target vehicle trajectory is determined as a candidate travel path, whose origin is determined as a candidate origin while destination is determined as a candidate destination. If a length of travel time corresponding to a vehicle trajectory is greater than that of the historical time period, and an ending moment is within the historical time period, the vehicle trajectory is segmented with the trajectory before the historical time period discarded to obtain a target vehicle trajectory, and the target vehicle trajectory is determined as a candidate travel path, whose origin is determined as a candidate origin while destination is determined as a candidate destination. During trajectory segmentation, segmentation may be performed with reference to an actual trajectory and intention of the user. For example, a trajectory with a strong purpose is generated when an on-line hailed vehicle travels to pick up a passenger, a trajectory with a strong purpose is generated when the on-line hailed vehicle takes a passenger somewhere, and a trajectory with a strong purpose is generated when the vehicle contends for and is designated with an order in an empty state. After a trajectory is segmented, starting and ending positions in the trajectory are an origin and a destination.

Then, the computer device may perform origin clustering and destination clustering on each candidate travel path based on a reference point of interest to obtain an intermediate origin and intermediate destination corresponding to each candidate travel path. Specifically, position matching is performed on each candidate origin and each reference point of interest, and the candidate origin whose distance from a position of the reference point of interest is less than a preset threshold is clustered to the corresponding reference point of interest. Position matching is performed on each candidate destination and each reference point of interest, and the candidate destination whose distance from the position of the reference point of interest is less than the preset threshold is clustered to the corresponding reference point of interest. The candidate origin and destination whose distances from the position of the reference point of interest are less than the preset threshold are retained, so as to obtain the intermediate origin and intermediate destination corresponding to each candidate travel path. For example, if a candidate origin of a candidate travel path is a lane in the vicinity of an exit of shopping mall A, the candidate origin may be clustered to shopping mall A, and shopping mall A is determined as an intermediate origin of the candidate travel path. In this manner, performing origin clustering and destination clustering on each candidate travel path based on the reference point of interest may sort out the origins and destinations, which is conducive to obtaining a refined trip matrix.

Further, the computer device may cluster the candidate travel paths corresponding to the same intermediate origin and intermediate destination to obtain multiple target trip combinations, the target trip combination including at least one candidate travel path corresponding to the same intermediate origin and intermediate destination. That is, the candidate travel paths corresponding to the same OD pair are clustered to obtain multiple different OD pairs and at least one candidate travel path corresponding to each OD pair. The computer device may obtain a number of the candidate vehicles corresponding to the same target trip combination statistically to obtain an initial traffic flow corresponding to each target trip combination, and further generate the initial trip matrix based on each target trip combination and the corresponding initial traffic flow and candidate travel path. The initial trip matrix includes multiple OD pairs, an initial traffic flow corresponding to each OD pair, and at least one candidate travel path corresponding to each OD pair. It can be understood that there may be at least one travel path from point A to point B, and thus an OD pair may correspond to at least one candidate travel path.

In this embodiment, trajectory segmentation is performed on the target vehicle trajectory data to obtain the candidate travel paths respectively corresponding to the multiple candidate vehicles, the candidate travel path including the candidate origin and the candidate destination, and origin clustering and destination clustering are performed on each candidate travel path based on the reference point of interest to obtain the intermediate origin and intermediate destination corresponding to each candidate travel path. In this manner, scattered origins and destinations may be clustered to landmark geographic positions to obtain candidate travel paths capable of reflecting a real traffic requirement more accurately. Then, the candidate travel paths corresponding to the same intermediate origin and intermediate destination are clustered to obtain the multiple target trip combinations. The number of the candidate vehicles corresponding to the same target trip combination is obtained statistically to obtain the initial traffic flow corresponding to each target trip combination, the target trip combination including the at least one candidate travel path corresponding to the same intermediate origin and intermediate destination. The initial trip matrix may be generated rapidly based on each target trip combination and the corresponding initial traffic flow and candidate travel path.

In an embodiment, the initial trip matrix includes multiple target trip combinations and an initial traffic flow corresponding to each target trip combination. The operation of adjusting the initial trip matrix based on the target traffic flow data to obtain a historical trip matrix corresponding to the historical time period includes:

performing an expansion process on the initial traffic flow corresponding to each target trip combination based on the target traffic flow data to obtain an intermediate traffic flow corresponding to each target trip combination; performing a check process on each intermediate traffic flow based on the target traffic flow data to obtain an estimated traffic flow corresponding to each target trip combination; and adjusting, based on the estimated traffic flow corresponding to each target trip combination, the corresponding initial traffic flow to obtain the historical trip matrix.

The expansion process refers to increasing the initial traffic flow in a certain ratio. The expansion process is used for roughly adjusting the initial traffic flow to obtain an intermediate traffic flow. The check process is used for finely adjusting the intermediate traffic flow to obtain an estimated traffic flow such that an overall estimated traffic flow is close to or consistent with a historical traffic flow. The historical traffic flow refers to a traffic flow statistically obtained on a real section in the historical time period.

Specifically, the computer device may obtain a historical traffic flow corresponding to each target trip combination and a historical traffic flow corresponding to each segment based on the target traffic flow data. The computer device may perform an expansion process on the initial traffic flow corresponding to each target trip combination based on the target traffic flow data to roughly increase OD pairs passing through a specific segment in a certain ratio according to a historical section traffic flow to obtain an intermediate traffic flow corresponding to each target trip combination. For example, if an initial traffic flow corresponding to an OD pair in an initial trip matrix is 80, and it is determined according to the target traffic flow data that a historical traffic flow corresponding to the OD pair is 100, the initial traffic flow may be preliminarily expanded to 100. It can be understood that expansion ratios of different OD pairs may be the same or different. For example, a corresponding expansion ratio may be determined according to the corresponding initial traffic flow and historical traffic flow.

Further, segments affect each other and further affect traffic flows between paths. Therefore, only performing an expansion process on an initial traffic flow corresponding to each OD pair may further result in continuous increase of the traffic flows corresponding to a part of OD pairs to exceed historical traffic flows. Therefore, after performing the expansion process on the initial traffic flow corresponding to each target trip combination based on the target traffic flow data to obtain the intermediate traffic flow corresponding to each target trip combination, the computer device further needs to perform a check process on each intermediate traffic flow based on the target traffic flow data, and further adjust each intermediate traffic flow to obtain an estimated traffic flow corresponding to each target trip combination such that an overall estimated traffic flow is close to an overall historical traffic flow. For example, there is a corresponding traffic flow influence factor between different candidate travel paths. The traffic flow influence factor may be obtained analytically based on big data, or may be set artificially by experience. After obtaining the intermediate traffic flow corresponding to each target trip combination, the computer device may adjust each intermediate traffic flow based on the traffic flow influence factor to obtain a reference traffic flow corresponding to each target trip combination, the reference traffic flow comprehensively considering the expansion process and impact between different paths. Then, the computer device further adjusts the reference traffic flow based on a traffic flow difference between the reference traffic flow and historical traffic flow corresponding to each target trip combination and the traffic flow influence factor until the traffic flow difference between the reference traffic flow and the historical traffic flow is less than a preset threshold, and determines a reference traffic flow obtained by last adjustment as an estimated traffic flow corresponding to the target trip combination. Finally, the computer device adjusts, based on the estimated traffic flow corresponding to each target trip combination, the corresponding initial traffic flow to obtain the historical trip matrix. That is, the initial traffic flow in the initial trip matrix is replaced with the corresponding estimated traffic flow.

Figure 4:
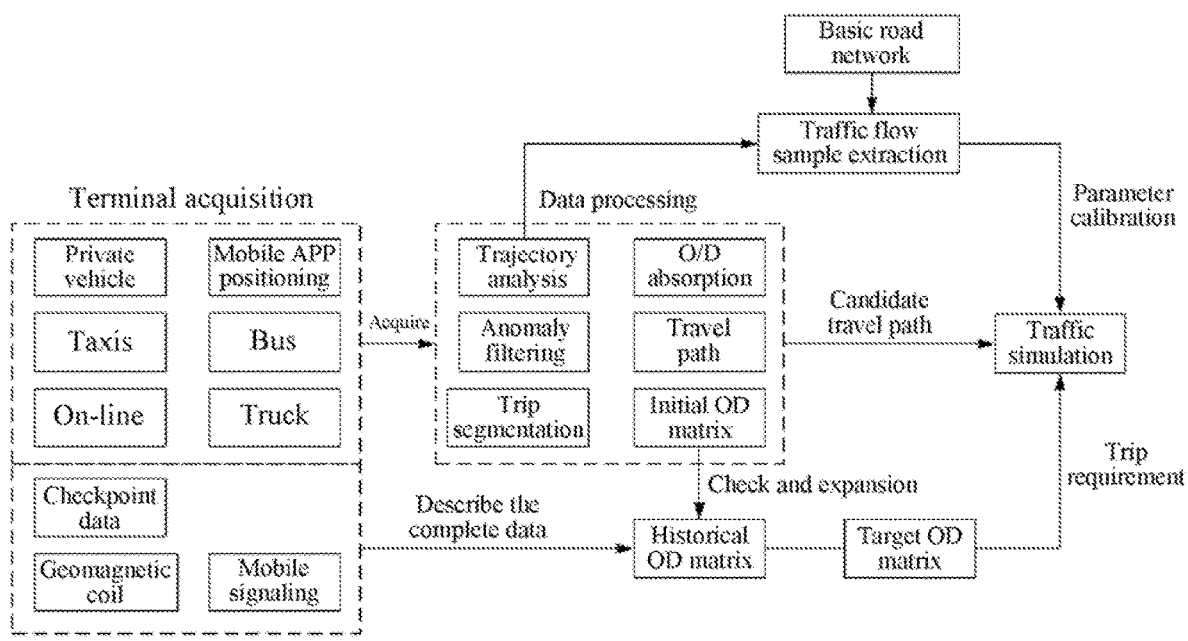
FIG. 4 is a schematic flowchart of traffic requirement mining according to an embodiment.

Urban traffic requirement mining refers to analyzing a trip requirement by a big data technology. Referring to FIG. 4, the computer device may mine traffic flows between different OD pairs in a city by combining historical vehicle trajectories of a private vehicle, a taxi, a bus, a truck, and an on-line hailed vehicle, mobile signaling, mobile APP positioning, a bus trip code, a geomagnetic coil, a checkpoint, and other data, to generate an OD matrix. Specifically, the computer device first segments a trip trajectory of a user from collected multi-source data to obtain a candidate travel path including a candidate origin and destination. Then, the computer device performs traffic cell absorption on the candidate origin/candidate destination. Traffic cell absorption is performed by searching for a closest reference point of interest according to the origin/destination. That is, origin clustering and destination clustering are performed. In this manner, the computer device may obtain a most primitive initial OD matrix statistically, i.e., a traffic OD matrix and candidate travel paths sampled from the reality. The initial OD matrix may include initial traffic flows corresponding to different OD pairs respectively. Further, the initial OD matrix may also include travel heat of different transportation means on paths between different OD pairs, i.e., the initial traffic flows corresponding to different transportation means between different OD pairs. Anomaly filtering is mainly for abnormal trajectories. For example, abnormal trajectories may be determined based on abnormal driving behaviors of a driver, such as abnormal stopping, waiting for an order by the road, staying for a long time in a region, and positioning trajectory drifting.

Then, the computer device checks and expands the initial OD matrix by combining a traffic section flow such as a geomagnetic coil and a checkpoint, and complete data such as mobile signaling, to estimate a traffic OD matrix closest to the reality and used for describing complete trip information, so as to complete OD matrix estimation to obtain a historical OD matrix. The computer device may generate a target OD matrix based on the historical OD matrix, the target OD matrix describing a trip requirement in the current time period. Further, the computer device may perform traffic simulation based on the target OD matrix. The target OD matrix provides the trip requirement for traffic simulation. The target OD matrix or the initial OD matrix provides a candidate travel path for traffic simulation. In addition, parameter calibration may be performed on a traffic flow model in mesoscopic traffic simulation and an autonomous driving model in microscopic traffic simulation based on traffic data collected from the reality. The computer device may extract a traffic flow sample from a basic road network (i.e., the real road network), and perform data analysis on the traffic flow sample, so as to perform parameter calibration on the traffic flow model and the autonomous driving model. The traffic flow sample include massive statistical data of speeds, densities, flows, etc., of segments and sensor data returned in a real vehicle road test.

In this embodiment, the expansion process and the check process are performed on the initial traffic flow corresponding to each target trip combination based on the target traffic flow data. Therefore, a target traffic flow closest to the reality may be estimated to further obtain a traffic OD matrix closest to the reality.

Figure 5:
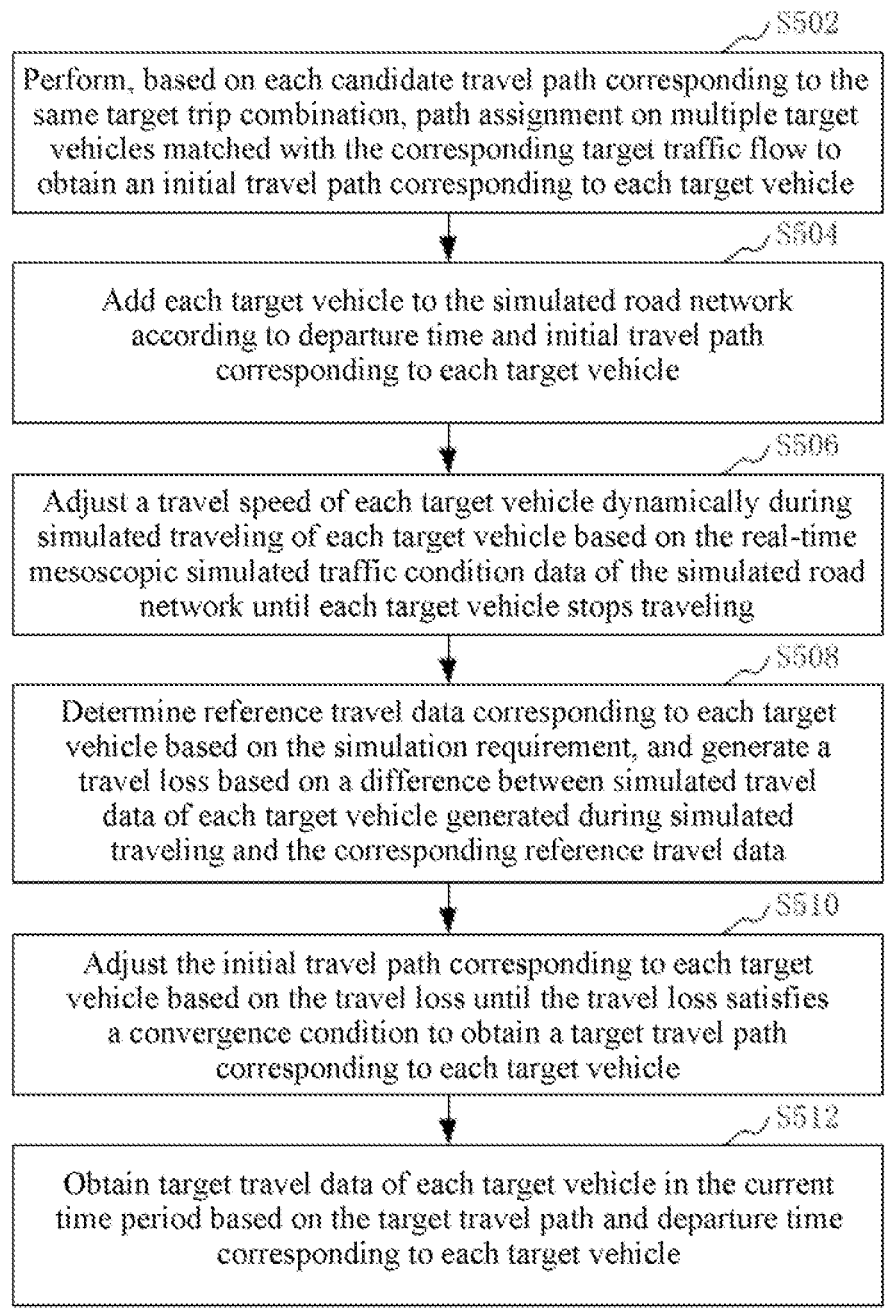
FIG. 5 is a schematic flowchart of mesoscopic traffic simulation according to an embodiment.

In an embodiment, the target trip matrix includes multiple target trip combinations as well as a target traffic flow and multiple candidate travel paths corresponding to each target trip combination. As shown in FIG. 5, the operation of performing mesoscopic traffic simulation on a target vehicle corresponding to the target trip matrix based on starting mesoscopic simulated traffic condition data corresponding to the current time period and a simulation requirement to obtain target travel data of the target vehicle in the current time period includes the following steps:

Step S502: Perform, based on each candidate travel path corresponding to the same target trip combination, path assignment on multiple target vehicles matched with the corresponding target traffic flow to obtain an initial travel path corresponding to each target vehicle.

The target trip matrix includes multiple target trip combinations, a target traffic flow corresponding to each target trip combination, and multiple candidate travel paths corresponding to each target trip combination.

Specifically, the computer device may perform, based on each candidate travel path corresponding to the same target trip combination, path assignment on multiple target vehicles matched with the corresponding target traffic flow to obtain an initial travel path corresponding to each target vehicle. For example, if an OD pair corresponds to a target traffic flow of 100 and three candidate travel paths including candidate travel path 1, candidate travel path 2, and candidate travel path 3, 100 target vehicles may be assigned to the three candidate travel paths, an assignment ratio being set as required. If the assignment ratio is 1: 2: 1, 25 target vehicles are assigned to candidate travel path 1, and initial travel paths corresponding to the 25 target vehicles are candidate travel path 1; 50 target vehicles are assigned to candidate travel path 2, and initial travel paths corresponding to the 50 target vehicles are candidate travel path 2; and 25 target vehicles are assigned to candidate travel path 3, and initial travel paths corresponding to the 25 target vehicles are candidate travel path 3.

Step S504: Add each target vehicle to the simulated road network according to departure time and initial travel path corresponding to each target vehicle.

Step S506: Adjust a travel speed of each target vehicle dynamically during simulated traveling of each target vehicle based on the real-time mesoscopic simulated traffic condition data of the simulated road network until each target vehicle stops traveling.

Specifically, after determining the initial travel path corresponding to each target vehicle, the computer device may add each target vehicle to the simulated road network according to departure time and initial travel path corresponding to each target vehicle such that each target vehicle travels in the simulated road network. The computer device may adjust a travel speed of each target vehicle dynamically during simulated traveling of each target vehicle based on the real-time mesoscopic simulated traffic condition data of the simulated road network until each target vehicle travels to the corresponding destination, namely each target vehicle stops traveling. The departure time corresponding to each target vehicle may be determined according to historical path departure time distribution information. The historical path departure time distribution information refers to a distribution of departure time of vehicles on each candidate travel path corresponding to the same OD pair. Different OD pairs may correspond to different historical path departure time distribution information. For example, historical path departure time distribution information corresponding to an OD pair is that 20% of vehicles depart every 5 minutes on candidate travel path 1, 30% of vehicles depart every 3 minutes on candidate travel path 2, and 40% of vehicles depart every 7 minutes on candidate travel path 3.

Step S508: Determine reference travel data corresponding to each target vehicle based on the simulation requirement, and generate a travel loss based on a difference between simulated travel data of each target vehicle generated during simulated traveling and the corresponding reference travel data.

Step S510: Adjust the initial travel path corresponding to each target vehicle based on the travel loss until the travel loss satisfies a convergence condition to obtain a target travel path corresponding to each target vehicle.

The reference travel data refers to travel data expected to be generated by traveling of the target vehicle based on the simulation requirement. The reference travel data may include travel data generated by all the target vehicles during completion of one travel, or may include travel data generated by all the target vehicles during completion of multiple travels. The simulated travel data refers to travel data generated by traveling of the target vehicle based on the initial travel path.

Specifically, the computer device may finally assign different candidate travel paths to the target vehicle for different simulation requirements. Therefore, the computer device needs to first determine the simulation requirement, i.e., the simulation target, and then determine reference travel data corresponding to each target vehicle based on the simulation requirement. During mesoscopic traffic simulation, the computer device assigns the initial travel path to the target vehicle first, and the target vehicle travels in the simulated road network according to the initial travel path, and generates simulated travel data. If the simulated travel data differs not so greatly from the reference travel data, it indicates that the assigned initial travel path is reasonable and capable of meeting the simulation requirement, and the computer device may determine the initial travel path as a target travel path. If the simulated travel data differs greatly from the reference travel data, it indicates that the assigned initial travel path is unreasonable and incapable of meeting the simulation requirement. In such case, the computer device needs to assign a new initial travel path to the target vehicle, and the target vehicle travels in the simulated road network according to the new initial travel path, and generates new simulated travel data. If the simulated travel data still differs greatly from the reference travel data, a new initial travel path continues to be assigned to the target vehicle until the simulated travel data differs not so greatly from the reference travel data, and a latest initial travel path is determined as the target travel path. Therefore, the computer device may generate a travel loss based on a difference between simulated travel data of each target vehicle generated during simulated traveling and the corresponding reference travel data, adjust the initial travel path corresponding to each target vehicle based on the travel loss, and perform the operation of adding each target vehicle to the simulated road network according to departure time and initial travel path corresponding to each target vehicle until the travel loss satisfies a convergence condition to obtain a target travel path corresponding to each target vehicle. The convergence condition may be that the travel loss is less than a preset threshold, a number of iterations reaches a preset threshold, etc. Moreover, different simulation requirements may correspond to different preset thresholds.

Step S512: Obtain target travel data of each target vehicle in the current time period based on the target travel path and departure time corresponding to each target vehicle.

Specifically, after determining the target travel path corresponding to each target vehicle, the computer device may obtain target travel data of each target vehicle in the current time period based on the target travel path and departure time corresponding to each target vehicle.

Figure 6:
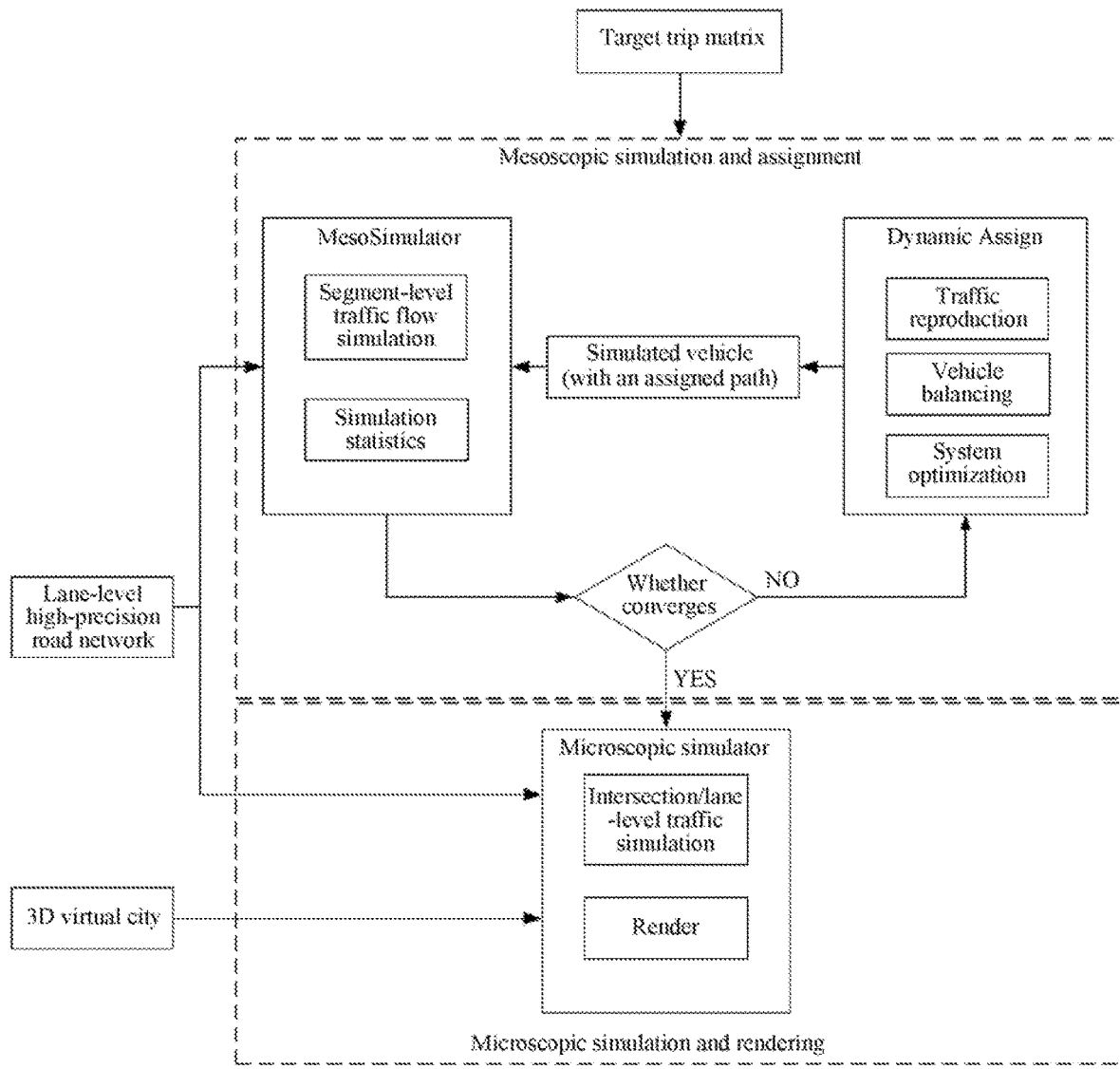
FIG. 6 is a schematic flowchart of mesoscopic simulation and assignment and microscopic simulation and rendering according to an embodiment.

Referring to FIG. 6, input data of mesoscopic traffic simulation is the target trip matrix obtained by traffic requirement mining. During mesoscopic traffic simulation (i.e., mesoscopic simulation and assignment), the computer device assigns, based on a candidate travel path in the target trip matrix, an initial travel path to a corresponding target vehicle, inputs the target vehicle containing the initial travel path to a mesoscopic simulator (meso-simulator), and performs segment-level traffic flow simulation in the mesoscopic simulator based on a lane-level high-precision road network. The computer device performs simulation statistics on simulated data in simulation through the mesoscopic simulator to obtain simulated travel data corresponding to the target vehicle, and determines reference travel data corresponding to the target vehicle based on a simulation requirement. The simulated travel data includes arrival time of the vehicle, information about time spent on a segment, and other data. The simulation requirement includes traffic reproduction, vehicle balancing, and system optimization. The computer device may generate a travel loss based on a difference between the simulated travel data and the reference travel data. For example, if the simulation requirement is traffic reproduction, the simulated travel data may include at least one of a simulated traffic flow and a simulated travel speed, the reference travel data may include at least one of a real traffic flow and a real travel speed, and the travel loss is generated based on a data difference between the same type of data in the simulated travel data and the reference travel data. When the travel loss satisfies a convergence condition, the initial travel path is determined as a target travel path, and target travel data is determined as input data of microscopic traffic simulation. When the travel loss does not satisfy the convergence condition, a new initial travel path is assigned dynamically to the target vehicle based on the travel loss until a new travel loss satisfies the convergence condition, a corresponding initial travel path is determined as a target travel path, and target travel data is determined as input data of microscopic traffic simulation. During microscopic traffic simulation (i.e., microscopic simulation and rendering), the computer device may input the target travel data output by the mesoscopic simulator to a microscopic simulator, perform intersection/lane-level traffic flow simulation in the microscopic simulator based on the lane-level high-precision road network to obtain microscopic simulated traffic condition data, and generate simulated and rendered visual video frames based on the microscopic simulated traffic condition data. Therefore, a traffic condition synchronized with the reality may finally be presented in a high-precision map and a 3D virtual urban environment based on the video frames.

In this embodiment, the reference travel data corresponding to each target vehicle is determined based on the simulation requirement, the travel loss is generated based on the difference between the simulated travel data of each target vehicle generated during simulated traveling and the corresponding reference travel data, and the initial travel path corresponding to each target vehicle is adjusted based on the travel loss until the travel loss satisfies the convergence condition to obtain the target travel path corresponding to each target vehicle. In this manner, the target travel path corresponding to the simulation requirement may be planned rapidly and accurately for the target vehicle by iterative convergence of the travel loss.

In an embodiment, the operation of performing, based on each candidate travel path corresponding to the same target trip combination, path assignment on multiple target vehicles matched with the corresponding target traffic flow to obtain an initial travel path corresponding to each target vehicle includes:

obtaining a historical path traffic flow distribution probability corresponding to each target trip combination; performing, based on the historical path traffic flow distribution probability corresponding to the same target trip combination, traffic flow assignment on each corresponding candidate travel path to obtain an assigned traffic flow corresponding to each candidate travel path; and obtaining the initial travel path corresponding to each target vehicle based on each candidate travel path and the corresponding assigned traffic flow.

The historical path traffic flow distribution probability refers to a distribution probability of vehicles on each candidate travel path corresponding to the same OD pair. For example, an OD pair corresponds to three candidate travel paths, and a historical path traffic flow distribution probability is 1:1:1, it indicates that the target vehicles may be equally assigned to the three candidate travel paths. Different OD pairs may correspond to different historical path traffic flow distribution probabilities.

Specifically, the computer device may perform statistical analysis on a historical path traffic flow distribution corresponding to each target trip combination to obtain a historical path traffic flow distribution probability corresponding to each target trip combination. When travel paths are assigned to the vehicles for the first time, the computer device may perform, based on the historical path traffic flow distribution probability corresponding to the same target trip combination, traffic flow assignment on each corresponding candidate travel path to obtain an assigned traffic flow corresponding to each candidate travel path, and assign the target vehicles corresponding to the same assigned traffic flow to the corresponding candidate travel path, so as to obtain the initial travel path corresponding to each target vehicle. For example, an OD pair corresponds to a target traffic flow of 90 and three candidate travel paths, and a historical path traffic flow distribution probability is 1:1:1. In such case, an assigned traffic flow corresponding to candidate travel path 1 is 30, and initial travel paths corresponding to 30 target vehicles are candidate travel path 1; an assigned traffic flow corresponding to candidate travel path 2 is 30, and initial candidate travel paths corresponding to 30 target vehicles are candidate travel path 2; and an assigned traffic flow corresponding to candidate travel path 3 is 30, and initial travel paths corresponding to 30 target vehicles are candidate travel path 3.

In this embodiment, the initial travel path assigned to the target vehicle for the first time is determined based on the historical path traffic flow distribution probability, so that the reliability of the initial travel path may be improved, and iterative convergence is accelerated.

In an embodiment, the operation of adjusting a travel speed of each target vehicle dynamically during simulated traveling of each target vehicle based on the real-time mesoscopic simulated traffic condition data of the simulated road network until each target vehicle stops traveling includes:

obtaining a traffic density within a preset range ahead of a current vehicle statistically according to a current position and current travel state of each traveling vehicle in the simulated road network; determining a reference travel speed of the current vehicle on a corresponding segment based on a traffic flow model and the traffic density; and updating the current position and current travel state of the current vehicle based on a real-time road state of each segment in the simulated road network and the reference travel speed of the current vehicle, and performing the operation of obtaining a traffic density within a preset range ahead of a current vehicle statistically according to a current position and current travel state of each traveling vehicle in the simulated road network, until each target vehicle stops traveling.

The travel state includes stopped, queuing, and traveling states, etc., and a travel speed corresponding to each state. The traffic flow model is used for describing a road capacity, how a traffic density within a certain distance ahead of a current vehicle on the road is determined, and a speed at which the vehicle may travel forward. For each urban road, its traffic capacity is completely different under different road grades, different bend radians, and different traffic scenes. The computer device may generate a traffic flow model including a density-speed relationship corresponding to each type of roads or each road based on massive accumulated historical statistical data of segments and sensor data returned in real vehicle road tests. The reference travel speed refers to a travel speed reachable by the target vehicle. The road state includes a traffic light state (red light, green light, yellow light, and corresponding countdowns) of the road, a congestion state of the road, and other information. Whether there is room on the road for newly added vehicles may be determined based on the congestion state of the road.

Specifically, when the target vehicle travels in the simulated road network according to the initial travel path, the computer device may obtain a traffic density within a preset range ahead of a current vehicle statistically according to a current position and current travel state of each traveling vehicle in the simulated road network, judge and determine a reference travel speed of the current vehicle on a corresponding segment based on a density-speed relationship in a traffic flow model, and restrict a travel speed of the current vehicle based on the reference travel speed. The computer device updates the current position and current travel state of the current vehicle based on a real-time road state of each segment in the simulated road network and the reference travel speed of the current vehicle, and performs the operation of obtaining a traffic density within a preset range ahead of a current vehicle statistically according to a current position and current travel state of each traveling vehicle in the simulated road network, until each target vehicle stops traveling. It can be understood that the computer device may obtain a reference travel speed of each traveling vehicle on each segment. The computer device may periodically update positions and states of all vehicles in the simulated road network, calculate a reference travel speed of each traveling vehicle on a corresponding segment, and restrict a travel speed of the traveling vehicle based on the reference travel speed until each target vehicle stops traveling. In this manner, the traveling vehicles in the simulated road network may affect and restrict each other during traveling, so that the traffic may be effectively kept in good order.

In this embodiment, the reference travel speed of the vehicle on the corresponding segment is determined based on the traffic flow model and the traffic density, so that the obtained reference travel speed is relatively accurate and reliable. Therefore, a travel speed of a real vehicle is simulated effectively, and the accuracy and reliability of a simulation result are further improved.

In an embodiment, when the simulation requirement is traffic reproduction, the operation of determining reference travel data corresponding to each target vehicle based on the simulation requirement and generating a travel loss based on a difference between simulated travel data of each target vehicle generated during simulated traveling and the corresponding reference travel data includes:

obtaining an actual traffic flow corresponding to each initial travel path in the current time period from a real road network, obtaining an actual travel speed corresponding to each initial travel path in the current time period, and obtaining a simulated traffic flow corresponding to each initial travel path from the simulated road network; determining simulated travel time corresponding to each target vehicle based on arrival time and departure time of each target vehicle, and calculating a simulated travel speed corresponding to each initial travel path based on the simulated travel time and initial travel path corresponding to each target vehicle; and calculating the travel loss based on a speed difference between the actual travel speed and simulated travel speed corresponding to each initial travel path and a traffic flow difference between the actual traffic flow and simulated traffic flow corresponding to each initial travel path.

The real road network refers to an actual road network in real life. The actual traffic flow refers to a real traffic flow obtained statistically according to traveling vehicles in the real road network. The actual travel speed refers to an average travel speed obtained statistically according to the traveling vehicles in the real road network. The simulated traffic flow refers to a virtual traffic flow obtained statistically according to traveling vehicles in the simulated road network. The simulated travel speed refers to an average travel speed obtained statistically according to the traveling vehicles in the real road network. An average travel speed corresponding to a path may be calculated based on a length of the path and average travel time of vehicles on the path.

Specifically, traffic reproduction is to reproduce a real traffic condition, and when a simulated section traffic flow and average speed are close to real values of an actual section traffic flow and average speed, it may be considered that traffic reproduction is implemented. Therefore, when the simulation requirement is traffic reproduction, the computer device may obtain an actual traffic flow corresponding to each initial travel path in the current time period from a real road network, obtain an actual travel speed corresponding to each initial travel path in the current time period, and determine the actual traffic flow and the actual travel speed as the reference travel data. During traffic simulation, after all the target vehicles stop traveling, the computer device may calculate simulated travel time corresponding to each target vehicle based on arrival time and departure time of each target vehicle, calculate a simulated travel speed corresponding to each initial travel path based on the simulated travel time and initial travel path corresponding to each target vehicle, calculate a simulated traffic flow corresponding to each initial travel path based on the traveling vehicles in the simulated road network, and determine the simulated travel speed and the simulated traffic flow as the simulated travel data. In this manner, the computer device may calculate the travel loss based on a speed difference between the actual travel speed and simulated travel speed corresponding to each target vehicle and a traffic flow difference between the actual traffic flow and simulated traffic flow corresponding to each initial travel path. When the travel loss satisfies the convergence condition, it indicates that traveling of the target vehicle according to the currently assigned initial travel path may make the simulated section traffic flow and average speed approximate to the actual section traffic flow and average speed, so as to implement traffic reproduction.

In an embodiment, when the simulation requirement is vehicle balancing, the operation of determining reference travel data corresponding to each target vehicle based on the simulation requirement and generating a travel loss based on a difference between simulated travel data of each target vehicle generated during simulated traveling and the corresponding reference travel data includes:

predicting target travel time corresponding to each target vehicle based on the starting mesoscopic simulated traffic condition data; determining simulated travel time corresponding to each target vehicle based on arrival time and departure time of each target vehicle; and calculating the travel loss based on a time difference between the target travel time and simulated travel time corresponding to each target vehicle.

Specifically, vehicle balancing (also referred to as user balancing) is a kind of dynamic balancing, and a final simulation result may achieve a traffic balance between different vehicles (users), without an unbalanced state that, according to the same or similar trip distances, time spent by a part of vehicles (users) to arrive at destinations is very long while time spent by the other part of vehicles (users) is very short. Therefore, when the simulation requirement is vehicle balancing, before all the target vehicles start traveling, the computer device may predict target travel time taken for each target vehicle to arrive at destinations based on the starting mesoscopic simulated traffic condition data. For example, average travel time of vehicles on each road is determined according to the starting mesoscopic simulated traffic condition data, so as to obtain average travel time corresponding to each candidate travel path and further calculate, based on the average travel time corresponding to each candidate travel path corresponding to the same target trip combination, target travel time corresponding to each target vehicle corresponding to the target trip combination. After all the target vehicles stop traveling, the computer device may calculate simulated travel time corresponding to each target vehicle based on arrival time and departure time of each target vehicle, determine the simulated travel time as the simulated travel data, and determine the target travel time as the reference travel data. The computer device calculates the travel loss based on a time difference between the target travel time and simulated travel time corresponding to each target vehicle. When the travel loss satisfies the convergence condition, it indicates that traveling of the target vehicle according to the currently assigned initial travel path may make a current simulated traffic condition the same as or similar to a starting simulated traffic condition, so as to keep a traffic balance between different vehicles (users) to finally implement vehicle balancing (user balancing).

In an embodiment, when the simulation requirement is system optimization, the operation of determining reference travel data corresponding to each target vehicle based on the simulation requirement and generating a travel loss based on a difference between simulated travel data of each target vehicle generated during simulated traveling and the corresponding reference travel data includes:

calculating adjacent travel speeds corresponding to each segment in the simulated road network in adjacent simulated traveling processes based on simulated travel data of each target vehicle generated in the adjacent simulated traveling processes; calculating a travel speed change direction and a travel speed change ratio based on the adjacent travel speeds corresponding to each segment in the simulated road network in the adjacent simulated traveling processes; and generating the travel loss based on the travel speed change direction and the travel speed change ratio.

The adjacent simulated traveling processes refer to two adjacent simulated traveling processes. The adjacent travel speeds include average travel speeds corresponding to each segment in the two adjacent simulated traveling processes respectively. The travel speed change direction includes increase and decrease. An average travel speed corresponding to a segment may be calculated based on a length of the segment and average travel time of vehicles on the segment.

Specifically, System optimization is for a purpose of minimizing congestion ratios of all roads which may be reflected by average travel speeds on the roads. Therefore, when the simulation requirement is system optimization, the computer device may perform path assignment first on the target vehicle to obtain an initial travel path, and obtain simulated travel data generated by traveling of the target vehicle according to the initial travel path to calculate an average travel speed corresponding to each segment. The computer device performs path assignment again on the target vehicle to obtain a new initial travel path, and obtains simulated travel data generated by traveling of the target vehicle according to the new initial travel path to calculate an average travel speed corresponding to each segment. The computer device may calculate a travel speed change direction and a travel speed change ratio based on the average travel speeds corresponding to each segment in the two adjacent simulated traveling processes, and generate a travel loss based on the travel speed change direction and the travel speed change ratio. For example, weighted summation is performed on the travel speed change direction and travel speed change ratio corresponding to each segment to obtain the travel loss. The computer device may determine, based on the travel loss, whether the whole average travel speed corresponding to each segment keeps increasing. When it is determined based on the travel loss that the whole average travel speed corresponding to segment no longer increases or increases at a relatively low amplitude, it indicates that system optimization has been implemented. Therefore, the computer device may determine a last assigned initial travel path as a final target travel path.

In an embodiment, the target travel data includes a target travel path and departure time. The operation of performing microscopic traffic simulation on a traveling vehicle in a simulated road network corresponding to the starting mesoscopic simulated traffic condition data based on the target travel data to obtain real-time microscopic simulated traffic condition data corresponding to the current time period includes:

adding each target vehicle to the simulated road network to travel according to the departure time and target travel path corresponding to each target vehicle to obtain real-time microscopic simulated travel data of the traveling vehicle in the simulated road network in the current time period; determining starting microscopic simulated traffic condition data in a next time period corresponding to the current time period from the real-time microscopic simulated traffic condition data in the current time period; and converting the starting microscopic simulated traffic condition data into starting mesoscopic simulated traffic condition data corresponding to the next time period.

Specifically, the target travel data includes a target travel path and departure time. After mesoscopic traffic simulation ends, the computer device may obtain target travel data of each target vehicle in the current time period, i.e., a target travel path and departure time of each target vehicle in the current time period. Then, the computer device may add each target vehicle to the simulated road network to start traveling according to the departure time and target travel path corresponding to each target vehicle to obtain real-time microscopic simulated travel data of the traveling vehicle in the simulated road network in the current time period during simulated traveling of each traveling vehicle. Further, the computer device determines starting microscopic simulated traffic condition data in a next time period corresponding to the current time period from the real-time microscopic simulated traffic condition data in the current time period, and performs data conversion on the starting microscopic simulated traffic condition data to filter out data redundant for mesoscopic traffic simulation in the starting microscopic simulated traffic condition data, such as road surrounding environment information (flowers and trees, people, and high-rise buildings), to obtain starting mesoscopic simulated traffic condition data corresponding to the next time period. Alternatively, the computer device may obtain positional information and travel state corresponding to each traveling vehicle directly from starting microscopic simulated traffic condition data in a next time period, and generate starting mesoscopic simulated traffic condition data corresponding to the next time period based on the positional information and travel state corresponding to each traveling vehicle.

In an embodiment, the computer device may perform microscopic traffic simulation based on a microscopic autonomous driving model. The computer device calibrates the microscopic autonomous driving model in advance with reference to surrounding environment data sensed by real vehicles (such as information of surrounding vehicles within 150 meters, roads, billboards, and curbs) and driving behaviors of the vehicles (travel speed, whether to turn, whether to stop, etc.). The microscopic autonomous driving model may reproduce a working principle of an in-vehicle sensor in microscopic simulation, so as to help describe the ability of the vehicle in making a decision to respond to an emergency rapidly and accurately after sensing the surrounding environment. Microscopic traffic simulation based on an autonomous driving technology may present a simulation result of mesoscopic traffic simulation in form of finer and more accurate overtaking, following, lane changing, etc.

In an embodiment, after obtaining the target travel data of the target vehicle in the current time period, the computer device may locally accelerate simulation to generate the real-time microscopic simulated traffic condition data corresponding to the current time period, so as to prepare a final state of a traffic condition in a current time slice in advance before simulation of a next batch to further rapidly generate and cache each simulated and rendered virtual video frame. Then, the computer device may pack and transmit each video frame to a terminal for the terminal to play, or the computer device locally plays each video frame, so as to display a simulated traffic video to the user. Further, the computer device may generate a video frame in a target format. Scaling, view angle switching, and other operations may be performed on the video frame in the target format, so that playing the video frame in the target format may form a three-dimensional animation to stereoscopically display the simulated traffic condition to the user.

In this embodiment, microscopic traffic simulation may finely present the travel state of the target vehicle at each moment, so as to obtain accurate microscopic simulated traffic condition data. Moreover, the starting microscopic simulated traffic condition data in the next time period corresponding to the current time period is determined from the real-time microscopic simulated traffic condition data in the current time period, and the starting microscopic simulated traffic condition data is converted into the starting mesoscopic simulated traffic condition data corresponding to the next time period, so that the smooth transition of traffic simulation in the current time period and the next time period may be ensured, and the discontinuity of flashing of vehicles in transition may be avoided.

In an embodiment, the method further includes:
generating auxiliary navigation data based on the simulated traffic condition in the current time period; and
transmitting the auxiliary navigation data to a navigation server such that the navigation server performs navigation path planning according to the auxiliary navigation data.

The auxiliary navigation data is data for assisting a navigation server in performing navigation path planning for the terminal. The auxiliary navigation data may include information such as a traffic index, average travel speed, traffic flow, and simulation requirement of each segment. The traffic index, also referred to as a traffic congestion index or a traffic operation index, is a conceptual index value that comprehensively reflects whether a road network is clear or congested. For example, the traffic index is valued from 0 to 10, divided into five grades (i.e., "clear", "basically clear", "slightly congested", "moderately congested", and "heavily congested"). The larger the value, the more severe the traffic congestion. 0 to 2 represent clear: residents may arrive at destinations smoothly. 2 to 4 represent basically clear: residents spend 0.2 to 0.5 times more time on average for one trip than that when the roads are clear. 4 to 6 represent slightly congested: residents spend 0.5 to 0.8 times more time on average for one trip than that when the roads are clear. 6 to 8 represent moderately congested: residents spend 0.8 to 1.1 times more time on average for one trip than that when the roads are clear. 8 to 10 represents heavily congested: residents spend more than 1.1 times more time on average for one trip than that when the roads are clear. The traffic index may be calculated based on the average travel speed and traffic flow of the segment.

Specifically, the computer device may generate auxiliary navigation data based on the simulated traffic condition in the current time period, and transmit the auxiliary navigation data to the navigation server. After receiving the auxiliary navigation data, the navigation server may learn a traffic condition corresponding to traffic reproduction in the current time period based on the auxiliary navigation data, and further perform navigation path planning for the terminal. For example, if a current moment is 8:00, and the current time period is 8:15 to 8:30, the simulated traffic condition in the current time period is a predicted future traffic condition. The user may initiate a navigation request with the terminal. The terminal transmits the navigation request containing a navigation origin and a navigation destination to the navigation server. The navigation server performs navigation path planning for the terminal based on auxiliary navigation data to plan at least one better candidate navigation path that avoids a segment where congestion may occur, and transmits the candidate navigation path to the terminal. After receiving the candidate navigation path, the terminal may display it to the user. Alternatively, the navigation server may learn a traffic condition corresponding to each simulation requirement in the current time period based on the auxiliary navigation data, and further perform navigation path planning for the terminal. For example, the navigation server may learn traffic conditions respectively corresponding to traffic reproduction and system optimization based on the auxiliary navigation data, and further perform navigation path planning based on a difference between the traffic conditions respectively corresponding to traffic reproduction and system optimization. If a traffic flow corresponding to the same segment in traffic reproduction is greater than that in system optimization, the segment is avoided during navigation path planning, so that the traffic flow of the segment is reduced to a certain extent to approach system optimization.

In this embodiment, the auxiliary navigation data is generated based on the simulated traffic condition in the current time period and transmitted to the navigation server such that the navigation server performs navigation path planning according to the auxiliary navigation data. The navigation server may be helped to plan a more reliable navigation travel path for the terminal, and the effectiveness of navigation is improved.

Figure 7:
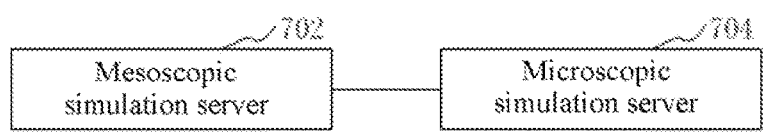
FIG. 7 is a schematic structural diagram of a traffic simulation system according to an embodiment.

In an embodiment, as shown in FIG. 7, a traffic simulation system is provided, which includes a mesoscopic simulation server 702 and a microscopic simulation server 704.

The mesoscopic simulation server 702 is configured to obtain a target trip matrix corresponding to a current time period, the target trip matrix describing trip information in the current time period, and perform mesoscopic traffic simulation on a target vehicle corresponding to the target trip matrix based on starting mesoscopic simulated traffic condition data corresponding to the current time period and a simulation requirement to obtain target travel data of the target vehicle in the current time period, the starting mesoscopic simulated traffic condition data being determined by the microscopic simulation server according to real-time microscopic simulated traffic condition data in a previous time period corresponding to the current time period and transmitted to the mesoscopic simulation server, mesoscopic traffic simulation being traffic simulation directed to vehicle groups, and mesoscopic traffic simulation being used for assigning a target travel path corresponding to the simulation requirement to the target vehicle.

The microscopic simulation server is configured to receive the target travel data transmitted by the mesoscopic simulation server, and perform microscopic traffic simulation on a traveling vehicle in a simulated road network corresponding to the starting mesoscopic simulated traffic condition data based on the target travel data to obtain real-time microscopic simulated traffic condition data corresponding to the current time period, the real-time microscopic simulated traffic condition data being used for obtaining a simulated traffic condition corresponding to the simulation requirement in the current time period, and microscopic traffic simulation being traffic simulation directed to vehicle individuals.

It can be understood that the specific processes of generation of the target trip matrix, mesoscopic traffic simulation, and microscopic traffic simulation may refer to the methods described in each related embodiment of the traffic simulation method, and will not be elaborated herein.

Figure 8:
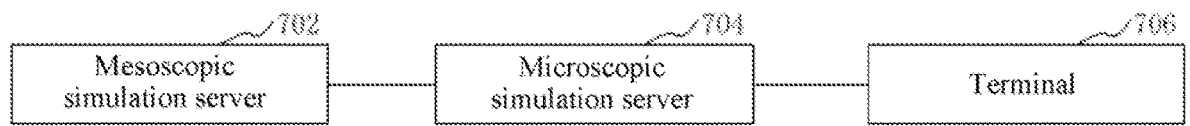
FIG. 8 is a schematic structural diagram of a traffic simulation system according to another embodiment.

In an embodiment, as shown in FIG. 8, the system further includes:

a terminal 706, configured to receive a target video frame set transmitted by the microscopic simulation server, and play the target video frame set to form a three-dimensional animation, the target video frame set including multiple video frames in a target format, and each video frame in the target format being generated by the microscopic simulation server by performing simulation and rendering on the real-time microscopic simulated traffic condition data.

The traffic simulation system may obtain the simulated traffic condition in the current time period rapidly and accurately by cooperation of the mesoscopic simulation server and the micro-simulation server. Moreover, the starting mesoscopic simulated traffic condition data corresponding to the current time period is determined according to the real-time microscopic simulated traffic condition data in the previous time period corresponding to the current time period, so that smooth transition may be ensured during switching of two adjacent batches of simulation, and flashing of vehicles may be avoided.

In one embodiment, the foregoing traffic simulation method may be applied to an urban traffic service scenario.

In urban traffic service, traffic simulation is an important part of intelligent transportation. A virtual system corresponding to the reality is constructed based on data of people, vehicles, roads, places, and things, and a basic traffic decision-making and planning support is provided for urban traffic managers. An accurate and efficient traffic simulation technology may not only help traffic departments know the situation of road congestion and predict traffic phenomena in the future, but also help cities construct traffic early warning and dispatch urban traffic systems.

Figure 9A:
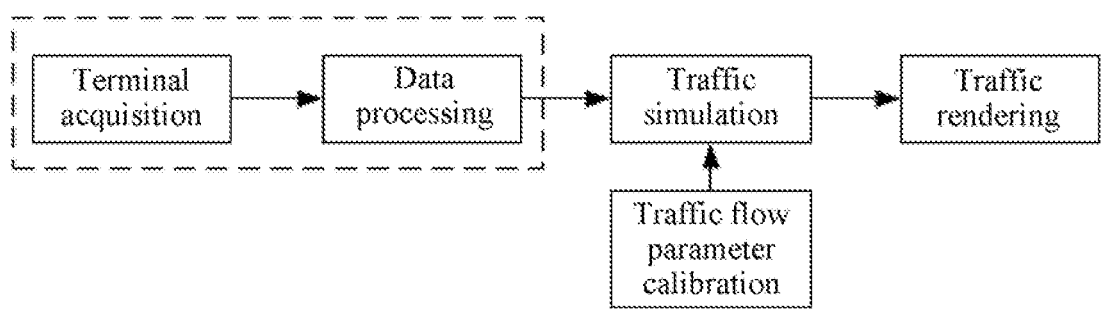
FIG. 9A is a schematic flowchart of an urban traffic simulation system according to an embodiment.

Referring to FIG. 9A, an urban traffic simulation system mainly includes the following modules:

1: a terminal acquisition and data processing module: collecting original data from multi-source data and mining traffic OD requirement and a historical trip path;

2: a traffic flow parameter calibration module: performing parameter calibration on a traffic capacity of each road in a road network using a certain model algorithm;

3: a traffic simulation module: planning a travel path and controlling operation of a vehicle according to traffic rules and a current position and state of the vehicle; and 4: a traffic rendering module: updating each position of the vehicle and displaying vehicles within a specified range in frames in combination with road network data.

When applied to the urban traffic service scenario, the traffic simulation method of the present disclosure includes the following steps.

First: traffic requirement mining: a traffic requirement OD matrix relatively close to real traffic is extracted directly and rapidly by full use of the real-time performance of urban traffic data, and a traffic requirement OD matrix in a current time period is predicted.

For example, traffic simulation is performed every 15 minutes. If a current moment is 8:00, fusion analysis may be performed according to multi-source data from 7:45 to 8:00, such as an urban vehicle trajectory flow, mobile signaling, and a traffic section flow, to mine a trip OD requirement to obtain a historical OD matrix from 7:45 to 8:00, and a target OD matrix from 8:00 to 8:15 is predicted based on the OD matrix from 7:45 to 8:00. The target OD matrix includes multiple OD pairs and a target traffic flow and candidate travel path corresponding to each OD pair.

Second: mesoscopic traffic simulation: Coordinated dispatching of traffic is implemented based on operational optimization to rapidly fit checkpoint flows and improve the iteration efficiency.

In order to manage and dispatch urban traffic and increase the simulation speed, required urban traffic ODs are assigned by vehicle from a mesoscopic perspective, and a traffic flow between ODs of each pair is assigned to corresponding candidate paths vehicle by vehicle based on a simulation requirement. Mesoscopic simulation results corresponding to different simulation requirements help to make the whole urban traffic in an unsaturated state of oversupply, namely there are no large-area congested segments or concentrated congested regions. The simulation requirement includes traffic reproduction, vehicle balancing, and system optimization. The process of mesoscopic traffic simulation is described with vehicle balancing as an example.

1: A target trip matrix obtained by traffic requirement mining is determined as input data of mesoscopic traffic simulation. Before target vehicles corresponding to 8:00 to 8:15 are added to a simulated road network, travel time for each vehicle to arrive at a destination is estimated according to a current state of the simulated road network (such as average travel time of vehicles on each road). The vehicles corresponding to a target traffic flow between OD of a pair are gradually assigned to each path. First vehicle path assignment may be performed according to a historical traffic flow distribution probability of the paths between the ODs of the pair.

2: A traffic density within a certain distance ahead is obtained statistically according to a current position and state of each vehicle in the simulated road network, and a travel speed reachable by each vehicle on each segment is judged and determined based on a density-speed relationship in a traffic flow model.

3: The positions and states of all the vehicles are updated as a whole based on a current state of each road (such as whether there is room for newly added vehicles and whether vehicles are in queue in front of traffic lights), the travel speed of each vehicle, and traffic rules.

4: 2 and 3 are repeated until all the vehicles arrive at destinations. Finally, whole-trip time of each vehicle and average time spent on each road are obtained statistically, and an overall travel time error of all the vehicles is determined. For example, the total travel time error equals an average value of (actual whole-trip time-estimated whole-trip time) of each vehicle/estimated whole-trip time.

5: Whether the overall travel time error obtained in 4 satisfies a convergence condition (for example, less than a certain threshold) is determined. If NO, 1 to 4 are repeated. If the convergence condition is satisfied, or a maximum number of iterations is reached, mesoscopic simulation is ended, and departure time and target travel path corresponding to each target vehicle from 8:00 to 8:15 are obtained.

It can be understood that different operational optimization models are used for different simulation requirements, each of which may perform simulation iteration according to the corresponding simulation requirement. For example, when the simulation requirement is traffic reproduction, a traffic reproduction model is used for mesoscopic traffic simulation, and when the simulation requirement is vehicle balancing, a vehicle balancing model is used for mesoscopic traffic simulation. Different operational optimization models correspond to different convergence conditions.

Third: microscopic traffic simulation: high-precision microscopic traffic simulation is performed based on a mesoscopic traffic simulation result, and a final traffic state of the current batch is synchronized to a next batch of simulation through a snapshot.

Figure 9B:
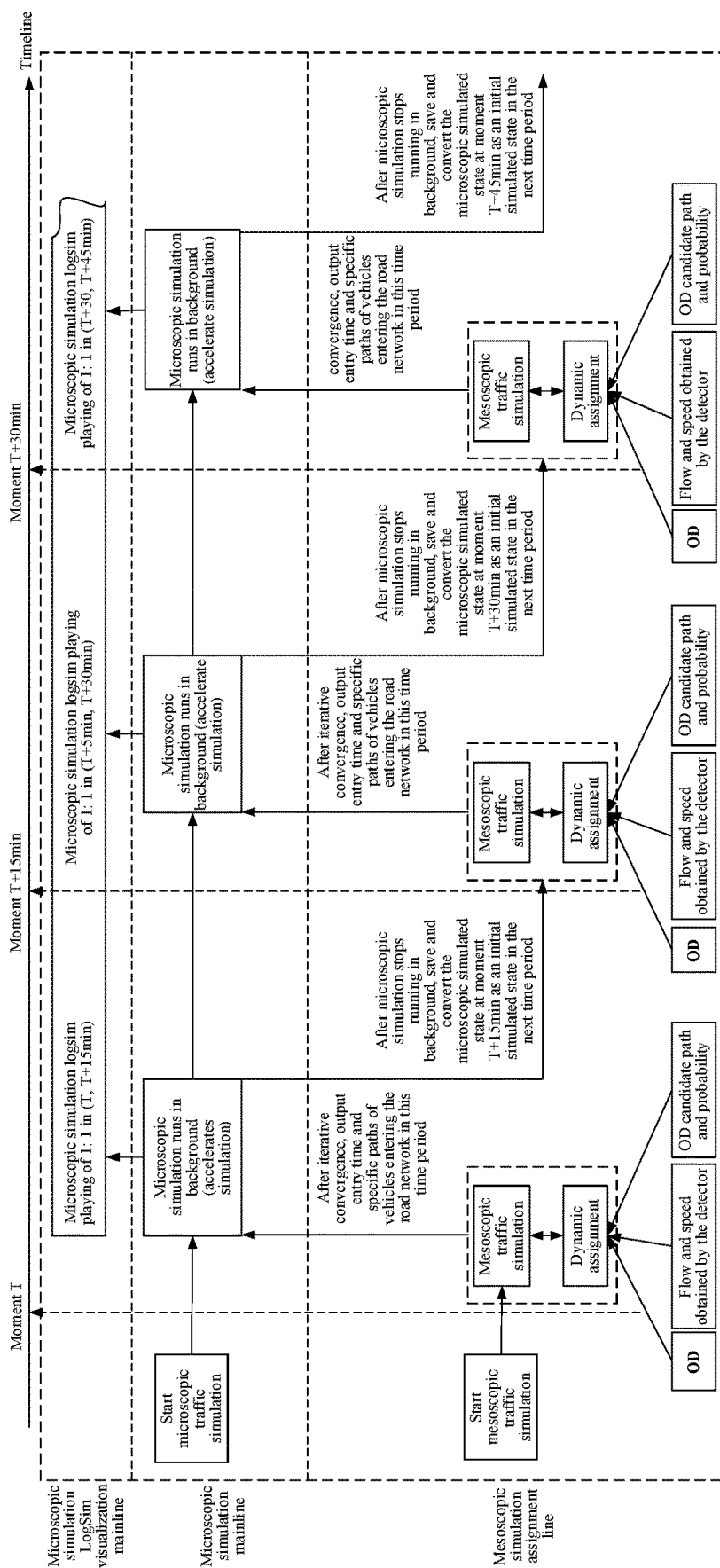
FIG. 9B is a schematic flowchart of a traffic simulation method according to another embodiment.

Referring to FIG. 9B, the first and second steps are considered as a mesoscopic simulation assignment line, the third step is considered as a microscopic simulation mainline, and the fourth step is considered as a microscopic simulation LogSim visualization line.

1: After the iterative convergence of mesoscopic traffic simulation, the mesoscopic simulation assignment line synchronizes the departure time and target travel paths corresponding to the vehicles entering the simulated road network from 8:00 to 8:15 to the microscopic simulation mainline.

2: After receiving the assignment result of the mesoscopic simulation assignment line, the microscopic simulation mainline accelerates simulation in background service at a highest speed. There are two main purposes for this: the first is to prepare a final traffic state in the current time slice in advance before the next batch, so that a traffic snapshot may be generated according to the final traffic state in the current time slice and synchronized to the mesoscopic simulation assignment line; and the second is to rapidly generate and cache each simulated and rendered visual frame for final synchronization to the microscopic simulation LogSim visualization line in form of a simulation log. The traffic snapshot is a method for specifically saving the traffic state of the road network at a particular moment.

3: After receiving the traffic snapshot, the mesoscopic simulation assignment line parses and converts the traffic snapshot into an initial state of mesoscopic traffic simulation in a next time slice. Then, a new round of mesoscopic traffic simulation is started upon arrival of a new traffic requirement OD matrix, a detector flow/speed (i.e., a flow/speed in a real road network), and other data. Finally, a convergence result is synchronized to the microscopic simulation mainline. The traffic snapshot may prevent the discontinuity of flashing and disappearance of traffic flows in transition of adjacent time slices.

Fourth: real-time on-line simulation: a logSim simulation mechanism parallel to snapshot is used to achieve a traffic simulation effect at a ratio of 1:1 to a physical clock.

In order to ensure the time consistency and authenticity between real-time simulation and reality, the simulation effect at the ratio of 1:1 to the physical clock may be achieved based on the log simulation (logSim) mechanism, namely one second elapses in the simulated road network if one second elapses in the real road network, and an immersive interactive experience may be brought.

1: After receiving a simulation result of the microscopic simulation mainline, the microscopic simulation LogSim visualization line may play back the entire traffic change process conveniently and efficiently through the log. Since the microscopic simulation mainline generates the log rapidly in advance, it is only necessary to directly read the log during visualization and update each frame in the log according to the ratio of 1:1 to the physical clock. That is, like a video buffer playing mechanism, the video is yet not played out but already buffered.

Figure 9C:
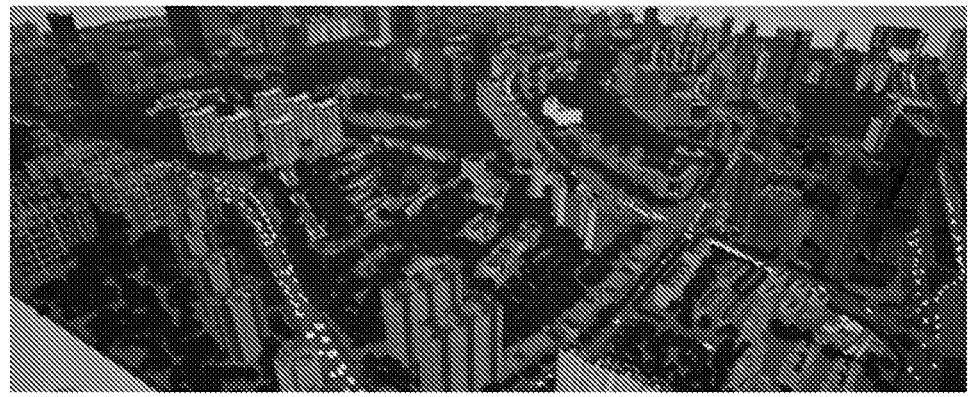
FIG. 9C is a schematic diagram of a traffic condition according to an embodiment.
Figure 9D:
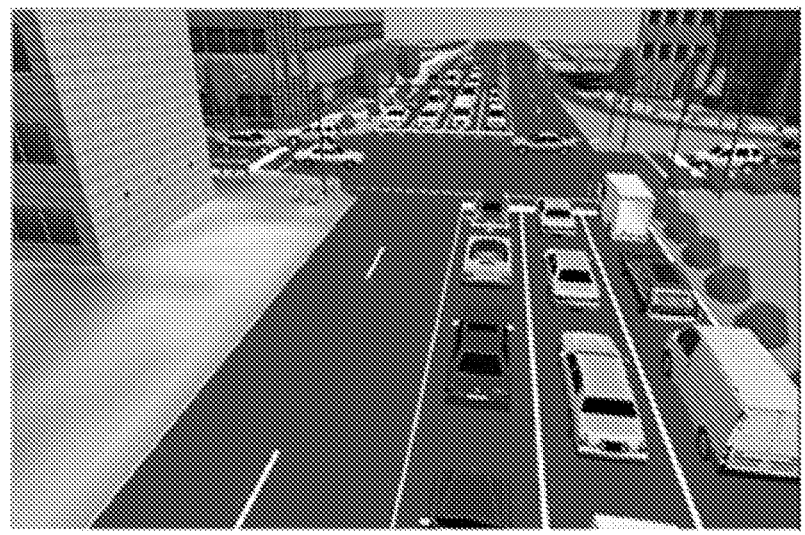
FIG. 9D is a schematic diagram of a traffic condition according to another embodiment.

2: The logSim mechanism plays back the traffic according to the ratio of 1:1 to the physical clock to eventually present an urban traffic system synchronized with the reality in a high-precision map and a 3D virtual urban environment. During log playing, scaling, view angle switching, and other operations may be performed. An overall display effect of a traffic condition of a region may be as shown in FIG. 9C, and a display effect of a local traffic condition obtained by scaling up a certain intersection in the region may be as shown in FIG. 9D.

The traffic simulation process is described again as a whole. Referring to FIG. 9B, the computer device starts traffic simulation every 15 minutes. At moment T, the computer device may obtain target traffic flow data (including flow statistically obtained by a detector) and target vehicle trajectory data before moment T to generate a historical OD matrix, and generate a target OD matrix corresponding to moment T to moment T+15 based on the historical OD matrix. The target OD matrix includes multiple OD pairs as well as a candidate travel path and target traffic flow corresponding to each OD pair. The computer device determines the target OD matrix as input data of mesoscopic traffic simulation, performs mesoscopic traffic simulation on a target vehicle corresponding to the target traffic flow in the target OD matrix based on mesoscopic simulated traffic condition data (i.e., starting mesoscopic simulated traffic condition data corresponding to a current time period) corresponding to moment T and a simulation requirement, and assigns a target travel path corresponding to the simulation requirement to the target vehicle. The target travel path of the target vehicle may finally be obtained through iterative convergence of the data. The computer device determines departure time and target travel path of the target vehicle as input data of microscopic traffic simulation, adds the target vehicle to a simulated road network for microscopic traffic simulation according to the departure time and the target travel path to obtain microscopic simulated traffic condition data (i.e., real-time microscopic simulated traffic condition data corresponding to the current time period) corresponding to each moment between moments T and T+15 in the simulated road network, and obtains therefrom and converts the microscopic simulated traffic condition corresponding to moment T+15 into starting mesoscopic simulated traffic condition data corresponding to moments T+15 to T+30. The computer device rapidly generates and caches each simulated and rendered virtual frame based on the real-time microscopic simulated traffic condition data from moments T to T+15 to obtain a simulation log, and finally plays each visual frame based on the simulation log through a logSim mechanism. At moment T+15, the computer device generates a new target OD matrix, starts a new round of traffic simulation to obtain microscopic simulated traffic condition data corresponding to each moment between moments T+15 and T+30, and so on, so as to present an urban traffic condition synchronized with the reality in real time in a high-precision map and a 3D virtual urban environment. For example, a round of simulation is started at moment T to obtain video frames corresponding to moments T to T+15, and the video frames corresponding to moments T to T+15 are synchronously played according to a ratio of 1: 1 to a physical clock. A round of simulation is started at moment T+15 to obtain video frames corresponding to moments T+15 to T+30, and the video frames corresponding to moments T+15 to T+30 are synchronously played according to the ratio of 1: 1 to the physical clock. A round of simulation is started at moment T+30 to obtain video frames corresponding to moments T+30 to T+45, and the video frames corresponding to moments T+30 to T+45 are synchronously played according to the ratio of 1: 1 to the physical clock. By that analogy, an urban traffic condition synchronized with the real time is played in real time. When the simulation requirement is traffic reproduction, the computer device further needs to obtain an actual traffic flow and actual travel speed (i.e., speeds statistically obtained by the detector) in a real road network as reference data.

It can be understood that the first to fourth steps may be completed in the same computer device, or may be completed collaboratively by multiple computer devices. For example, the mesoscopic simulation assignment line is implemented by a mesoscopic simulation server, the microscopic simulation mainline is implemented by a microscopic simulation server, and the microscopic simulation LogSim visualization line is implemented by a terminal.

In this embodiment, a real-time on-line traffic simulation solution is implemented in combination with the real-time performance of vehicle trajectories and a traffic snapshot mechanism from the perspective of microscopic traffic simulation. An on-line traffic requirement OD matrix is extracted first from massive real-time vehicle trajectories. A traffic requirement OD matrix is further predicted, and is output to the microscopic simulation mainline after dynamic assignment and iterative convergence of mesoscopic traffic simulation. Traffic snapshots are synchronized to the next batch of mesoscopic traffic simulation at appropriate time, to finally implement real-time on-line traffic simulation. In this manner, traffic simulation may be performed rapidly and accurately by full use of the real-time performance of trajectory big data and in combination with the advantages of mesoscopic and microscopic traffic simulation. In addition, the operational optimization model may be used for coordinated dispatching and management of urban traffic with relatively high generalization ability and applicability. The shortcoming of discontinuity of flashing in transition of real-time simulation may be overcome based on the traffic state snapshot synchronization mechanism. Microscopic simulation logSim playback and the mechanism synchronized with the physical clock ensure a realistic effect of real-time simulation.

The traffic simulation method in the present disclosure may be applied to any platform and product capable of displaying urban traffic, such as a large digital screen, traffic early warning and planning, and autonomous driving places of vehicle factories, and dynamic traffic conditions may be simulated and predicted timely to facilitate planned dispatching and decision-making.

It is to be understood that, although each step of the flowcharts in FIG. 2 to FIG. 6 is displayed sequentially according to arrows, the steps are not necessarily performed according to an order indicated by arrows. Unless otherwise explicitly specified in the present disclosure, execution of the steps is not strictly limited, and the steps may be performed in other sequences. In addition, at least some steps in FIG. 2 and FIG. 6 may include a plurality of steps or a plurality of stages. The steps or the stages are not necessarily performed at the same moment, and instead may be performed at different moments. A performing sequence of the steps or the stages is not necessarily performed in sequence, and instead may be performed in turn or alternately with another step or at least some of steps or stages of the another step.

Figure 10:
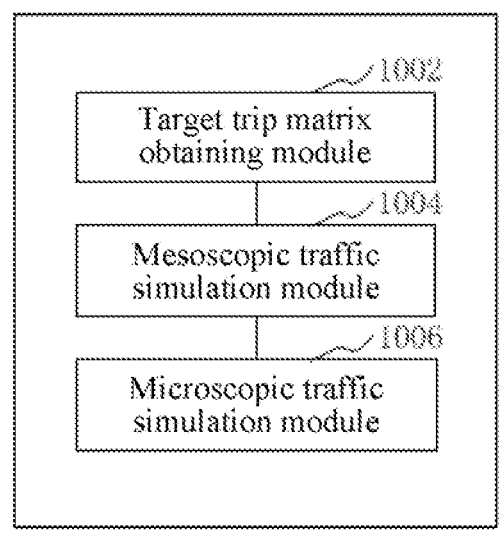
FIG. 10 is a structural block diagram of a traffic simulation apparatus according to an embodiment.

In an embodiment, as shown in FIG. 10, a traffic simulation apparatus is provided, which may be implemented as a part of a computer device by a software module, or a hardware module, or a combination thereof. The apparatus specifically includes a target trip matrix obtaining module 1002, a mesoscopic traffic simulation module 1004, and a microscopic traffic simulation module 1006.

The target trip matrix obtaining module 1002 is configured to obtain a target trip matrix corresponding to a current time period, the target trip matrix describing trip information in the current time period.

The mesoscopic traffic simulation module 1004 is configured to perform mesoscopic traffic simulation on a target vehicle corresponding to the target trip matrix based on starting mesoscopic simulated traffic condition data corresponding to the current time period and a simulation requirement to obtain target travel data of the target vehicle in the current time period, the starting mesoscopic simulated traffic condition data being determined according to real-time microscopic simulated traffic condition data in a previous time period corresponding to the current time period, mesoscopic traffic simulation being traffic simulation directed to vehicle groups, and mesoscopic traffic simulation being used for assigning a target travel path corresponding to the simulation requirement to the target vehicle.

The microscopic traffic simulation module 1006 is configured to perform microscopic traffic simulation on a traveling vehicle in a simulated road network corresponding to the starting mesoscopic simulated traffic condition data based on the target travel data to obtain real-time microscopic simulated traffic condition data corresponding to the current time period, the real-time microscopic simulated traffic condition data being used for obtaining a simulated traffic condition corresponding to the simulation requirement in the current time period, and microscopic traffic simulation being traffic simulation directed to vehicle individuals.

In an embodiment, the target trip matrix obtaining module is further configured to: obtain historical vehicle trajectory data and historical traffic flow data in a historical time period corresponding to the current time period; obtain vehicle trajectory data corresponding to a target region from the historical vehicle trajectory data as target vehicle trajectory data, and obtain traffic flow data corresponding to the target region from the historical traffic flow data as target traffic flow data; perform trip analysis on the target vehicle trajectory data to obtain an initial trip matrix corresponding to the historical time period; adjust the initial trip matrix based on the target traffic flow data to obtain a historical trip matrix corresponding to the historical time period; and obtain the target trip matrix based on the historical trip matrix.

In an embodiment, the target trip matrix obtaining module is further configured to: perform trajectory segmentation on the target vehicle trajectory data to obtain candidate travel paths respectively corresponding to multiple candidate vehicles, the candidate travel path including a candidate origin and a candidate destination; perform origin clustering and destination clustering on each candidate travel path based on a reference point of interest to obtain an intermediate origin and intermediate destination corresponding to each candidate travel path; cluster the candidate travel paths corresponding to the same intermediate origin and intermediate destination to obtain multiple target trip combinations, and obtain a number of the candidate vehicles corresponding to the same target trip combination statistically to obtain an initial traffic flow corresponding to each target trip combination, the target trip combination including at least one candidate travel path corresponding to the same intermediate origin and intermediate destination; and generate the initial trip matrix based on each target trip combination and the corresponding initial traffic flow and candidate travel path.

In an embodiment, the initial trip matrix includes multiple target trip combinations and an initial traffic flow corresponding to each target trip combination. The target trip matrix obtaining module is further configured to perform an expansion process on the initial traffic flow corresponding to each target trip combination based on the target traffic flow data to obtain an intermediate traffic flow corresponding to each target trip combination, perform a check process on each intermediate traffic flow based on the target traffic flow data to obtain an estimated traffic flow corresponding to each target trip combination, and adjust, based on the estimated traffic flow corresponding to each target trip combination, the corresponding initial traffic flow to obtain the historical trip matrix.

In an embodiment, the target trip matrix includes multiple target trip combinations as well as a target traffic flow and multiple candidate travel paths corresponding to each target trip combination. The mesoscopic traffic simulation module is further configured to: perform, based on each candidate travel path corresponding to the same target trip combination, path assignment on multiple target vehicles matched with the corresponding target traffic flow to obtain an initial travel path corresponding to each target vehicle; add each target vehicle to the simulated road network according to departure time and initial travel path corresponding to each target vehicle; adjust a travel speed of each target vehicle dynamically during simulated traveling of each target vehicle based on the real-time mesoscopic simulated traffic condition data of the simulated road network until each target vehicle stops traveling; determine reference travel data corresponding to each target vehicle based on the simulation requirement, and generate a travel loss based on a difference between simulated travel data of each target vehicle generated during simulated traveling and the corresponding reference travel data; adjust the initial travel path corresponding to each target vehicle based on the travel loss until the travel loss satisfies a convergence condition to obtain a target travel path corresponding to each target vehicle; and obtain target travel data of each target vehicle in the current time period based on the target travel path and departure time corresponding to each target vehicle.

In an embodiment, the mesoscopic traffic simulation module is further configured to obtain a historical path traffic flow distribution probability corresponding to each target trip combination, perform, based on the historical path traffic flow distribution probability corresponding to the same target trip combination, traffic flow assignment on each corresponding candidate travel path to obtain an assigned traffic flow corresponding to each candidate travel path, and obtain the initial travel path corresponding to each target vehicle based on each candidate travel path and the corresponding assigned traffic flow.

In an embodiment, the mesoscopic traffic simulation module is further configured to: obtain a traffic density within a preset range ahead of a current vehicle statistically according to a current position and current travel state of each traveling vehicle in the simulated road network; determine a reference travel speed of the current vehicle on a corresponding segment based on a traffic flow model and the traffic density; and update the current position and current travel state of the current vehicle based on a real-time road state of each segment in the simulated road network and the reference travel speed of the current vehicle, and perform the operation of obtaining a traffic density within a preset range ahead of a current vehicle statistically according to a current position and current travel state of each traveling vehicle in the simulated road network, until each target vehicle stops traveling.

In an embodiment, when the simulation requirement is traffic reproduction, the mesoscopic traffic simulation module is further configured to: obtain an actual traffic flow corresponding to each initial travel path in the current time period from a real road network, obtain an actual travel speed corresponding to each initial travel path in the current time period, and obtain a simulated traffic flow corresponding to each initial travel path from the simulated road network; determine simulated travel time corresponding to each target vehicle based on arrival time and departure time of each target vehicle, and calculate a simulated travel speed corresponding to each initial travel path based on the simulated travel time and initial travel path corresponding to each target vehicle; and calculate the travel loss based on a speed difference between the actual travel speed and simulated travel speed corresponding to each initial travel path and a traffic flow difference between the actual traffic flow and simulated traffic flow corresponding to each initial travel path.

In an embodiment, when the simulation requirement is vehicle balancing, the mesoscopic traffic simulation module is further configured to predict target travel time corresponding to each target vehicle based on the starting mesoscopic simulated traffic condition data, determine simulated travel time corresponding to each target vehicle based on arrival time and departure time of each target vehicle, and calculate the travel loss based on a time difference between the target travel time and simulated travel time corresponding to each target vehicle.

In an embodiment, when the simulation requirement is system optimization, the mesoscopic traffic simulation module is further configured to calculate adjacent travel speeds corresponding to each section in the simulated road network in adjacent simulated traveling processes based on simulated travel data of each target vehicle generated in the adjacent simulated traveling processes, calculate a travel speed change direction and a travel speed change ratio based on the adjacent travel speeds corresponding to each segment in the simulated road network in the adjacent simulated traveling processes, and generate the travel loss based on the travel speed change direction and the travel speed change ratio.

In an embodiment, the target travel data includes a target travel path and departure time. The microscopic traffic simulation module is further configured to add each target vehicle to the simulated road network to travel according to the departure time and target travel path corresponding to each target vehicle to obtain real-time microscopic simulated travel data of the traveling vehicle in the simulated road network in the current time period, determine starting microscopic simulated traffic condition data in a next time period corresponding to the current time period from the real-time microscopic simulated traffic condition data in the current time period, and convert the starting microscopic simulated traffic condition data into starting mesoscopic simulated traffic condition data corresponding to the next time period.

Figure 11:
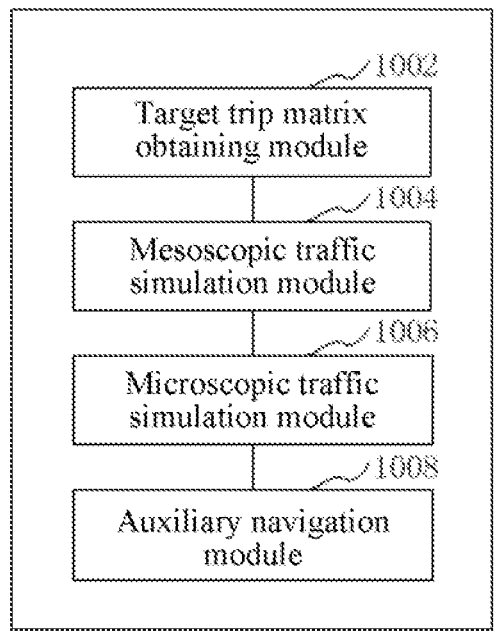
FIG. 11 is a structural block diagram of a traffic simulation apparatus according to an embodiment.

In an embodiment, as shown in FIG. 11, the apparatus further includes:

an auxiliary navigation module 1008, configured to generate auxiliary navigation data based on the simulated traffic condition in the current time period, and transmit the auxiliary navigation data to a navigation server such that the navigation server performs navigation path planning according to the auxiliary navigation data.

For a specific limitation on the traffic simulation apparatus, refer to the limitation on the traffic simulation method above. Details are not described herein again. The modules in the foregoing traffic simulation apparatus may be implemented entirely or partially by software, hardware, or a combination thereof. The foregoing modules may be built in or independent of a processor of a computer device in a hardware form, or may be stored in a memory of the computer device in a software form, so that the processor invokes and performs an operation corresponding to each of the foregoing modules.

In an embodiment, a computer device is provided. The computer device may be a server, and an internal structure diagram thereof may be shown in FIG. 12. The computer device includes a processor, a memory, and a network interface that are connected by using a system bus. The processor of the computer device is configured to provide computing and control capabilities. The memory of the computer device includes a non-volatile storage medium and an internal memory. The non-volatile storage medium stores an operating system, computer-readable instructions, and a database. The internal memory provides an environment for running of the operating system and the computer-readable instructions in the non-volatile storage medium. A database of the computer device is used for storing data, such as vehicle trajectory data, traffic flow data, a traffic flow model, mesoscopic/microscopic simulated traffic condition data, and auxiliary navigation data. The network interface of the computer device is configured to communicate with an external terminal through a network connection. The computer-readable instructions are executed by the processor to implement a traffic simulation method.

In an embodiment, a computer device is provided. The computer device may be a terminal, and an internal structure diagram thereof may be shown in FIG. 13. The computer device includes a processor, a memory, a communication interface, a display screen, and an input apparatus that are connected by using a system bus. The processor of the computer device is configured to provide computing and control capabilities. The memory of the computer device includes a non-volatile storage medium and an internal memory. The non-volatile storage medium stores an operating system and computer-readable instructions. The internal memory provides an environment for running of the operating system and the computer-readable instructions in the non-volatile storage medium. The communication interface of the computer device is configured to communicate with an external terminal in a wired or wireless manner. The wireless manner may be implemented through WIFI, an operator network, a near field communication (NFC) technology, or in other technologies. The computer-readable instructions are executed by the processor to implement a traffic simulation method. The display screen of the computer device may be a liquid crystal display screen or an electronic ink display screen. The input apparatus of the computer device may be a touch layer covering the display screen, or may be a key, a trackball, or a touch pad disposed on a housing of the computer device, or may be an external keyboard, a touch pad, a mouse, or the like.

Figure 12:
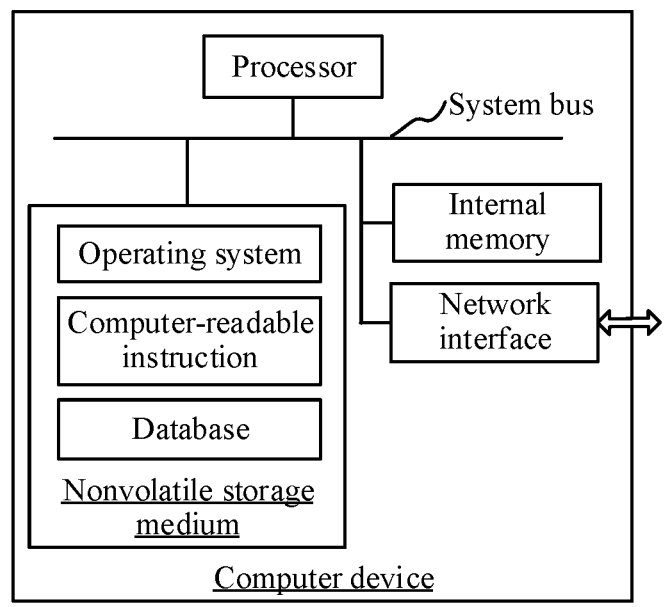
FIG. 12 is a diagram of an internal structure of a computer device according to an embodiment.
Figure 13:
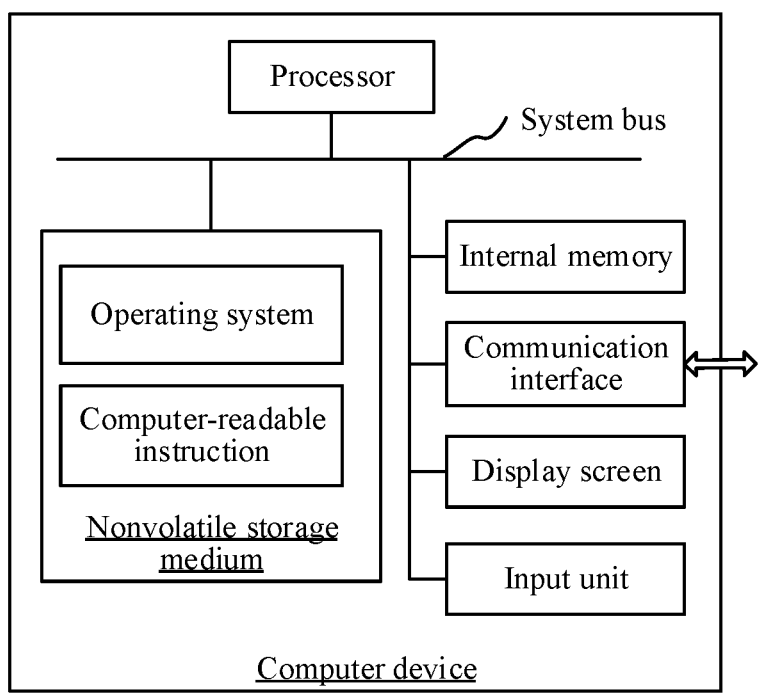
FIG. 13 is a diagram of an internal structure of a computer device according to an embodiment.

A person skilled in the art may understand that the structures shown in FIG. 12 and FIG. 13 are only block diagrams of a partial structure related to the solution of the present disclosure, and do not limit the computer device to which the solution of the present disclosure is applied. Specifically, the computer device may include more or fewer components than those shown in figures, or some components may be combined, or different component deployment may be used.

The term module (and other similar terms such as submodule, unit, subunit, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

In an embodiment, a computer device is further provided, including a memory and one or more processors, the memory storing computer-readable instructions, the one or more processors, when executing the computer-readable instructions, implementing the steps in the foregoing method embodiments.

In an embodiment, a computer-readable storage medium is provided, storing computer-readable instructions, the computer-readable instructions, when executed by one or more processors, implementing the steps in the foregoing method embodiments.

In an embodiment, a computer program product or a computer program is provided, including computer-readable instructions, and the computer-readable instructions being stored in a computer-readable storage medium. One or more processors of a computer device read the computer-readable instructions from the computer-readable storage medium, and the one or more processors execute the computer-readable instructions, to cause the computer device to perform the steps in the method embodiments.

A person of ordinary skill in the art may understand that all or some of the procedures of the methods of the foregoing embodiments may be implemented by computer-readable instructions instructing relevant hardware. The computer-readable instructions may be stored in a non-volatile computer-readable storage medium. When the computer-readable instructions are executed, the procedures of the embodiments of the foregoing methods may be included. Any reference to a memory, a storage, a database, or another medium used in the embodiments provided in the present disclosure may include at least one of a non-volatile memory and a volatile memory. The non-volatile memory may include a read-only memory (ROM), a magnetic tape, a floppy disk, a flash memory, an optical memory, and the like. The volatile memory may include a random access memory (RAM) or an external cache. For the purpose of description instead of limitation, the RAM is available in a plurality of forms, such as a static RAM (SRAM) or a dynamic RAM (DRAM).

Technical features of the foregoing embodiments may be combined in different manners to form other embodiments. To make description concise, not all possible combinations of the technical features in the foregoing embodiments are described. However, the combinations of these technical features shall be considered as falling within the scope recorded by this specification provided that no conflict exists.

The foregoing embodiments only describe several implementations of the present disclosure, which are described specifically and in detail, but cannot be construed as a limitation to the patent scope of the present disclosure. For a person of ordinary skill in the art, several transformations and improvements can be made without departing from the idea of the present disclosure. These transformations and improvements belong to the protection scope of the present disclosure. Therefore, the protection scope of the patent of the present disclosure shall be subject to the appended claims.

What is claimed is:

1. A traffic simulation method, performed by a computer device, the method comprising:

obtaining historical vehicle trajectory data and historical traffic flow data in a historical time period corresponding to a current time period;

obtaining vehicle trajectory data corresponding to a target region from the historical vehicle trajectory data as target vehicle trajectory data, and obtaining traffic flow data corresponding to the target region from the historical traffic flow data as target traffic flow data;

performing trip analysis on the target vehicle trajectory data to obtain an initial trip matrix corresponding to the historical time period, wherein the initial trip matrix comprises multiple target trip combinations and an initial traffic flow corresponding to each target trip combination;

expanding the initial traffic flow corresponding to each target trip combination based on the target traffic flow data to obtain an intermediate traffic flow corresponding to each target trip combination;

checking each intermediate traffic flow based on the target traffic flow data to obtain an estimated traffic flow corresponding to each target trip combination;

adjusting, based on the estimated traffic flow corresponding to each target trip combination, the corresponding initial traffic flow to obtain a historical trip matrix corresponding to the historical time period;

obtaining a target trip matrix corresponding to the current time period based on the historical trip matrix, the target trip matrix describing trip information in the current time period;

performing mesoscopic traffic simulation on a target vehicle corresponding to the target trip matrix based on starting mesoscopic simulated traffic condition data corresponding to the current time period and a simulation requirement, to obtain target travel data of the target vehicle in the current time period, the starting mesoscopic simulated traffic condition data being determined according to real-time microscopic simulated traffic condition data in a previous time period corresponding to the current time period, the mesoscopic traffic simulation being traffic simulation directed to vehicle groups, and the mesoscopic traffic simulation being used for assigning a target travel path corresponding to the simulation requirement to the target vehicle; and performing microscopic traffic simulation on a traveling vehicle in a simulated road network corresponding to the starting mesoscopic simulated traffic condition data based on the target travel data to obtain real-time microscopic simulated traffic condition data corresponding to the current time period, the real-time microscopic simulated traffic condition data being used for obtaining a simulated traffic condition corresponding to the simulation requirement in the current time period, and microscopic traffic simulation being traffic simulation directed to vehicle individuals.

2. The method according to claim 1, wherein the performing trip analysis on the target vehicle trajectory data to obtain an initial trip matrix corresponding to the historical time period comprises:

performing trajectory segmentation on the target vehicle trajectory data to obtain candidate travel paths respectively corresponding to multiple candidate vehicles, the candidate travel path comprising a candidate origin and a candidate destination;

performing origin clustering and destination clustering on each candidate travel path based on a reference point of interest to obtain an intermediate origin and intermediate destination corresponding to each candidate travel path;

clustering the candidate travel paths corresponding to the same intermediate origin and intermediate destination to obtain the multiple target trip combinations, and according to a number of the candidate vehicles corresponding to the same target trip combination, obtaining an initial traffic flow corresponding to each target trip combination, the target trip combination comprising at least one candidate travel path corresponding to the same intermediate origin and intermediate destination; and generating the initial trip matrix based on each target trip combination and the corresponding initial traffic flow and candidate travel path.

3. The method according to claim 1, wherein the target trip matrix comprises the multiple target trip combinations and a target traffic flow and multiple candidate travel paths corresponding to each of the multiple target trip combinations; and the performing mesoscopic traffic simulation on a target vehicle corresponding to the target trip matrix based on starting mesoscopic simulated traffic condition data corresponding to the current time period and a simulation requirement to obtain target travel data of the target vehicle in the current time period comprises:

performing, based on each candidate travel path corresponding to the same target trip combination, path assignment on multiple target vehicles matched with the corresponding target traffic flow to obtain an initial travel path corresponding to each target vehicle;

adding each target vehicle to the simulated road network according to departure time and initial travel path corresponding to each target vehicle;

adjusting a travel speed of each target vehicle dynamically during simulated traveling of each target vehicle based on the real-time mesoscopic simulated traffic condition data of the simulated road network until each target vehicle stops traveling;

determining reference travel data corresponding to each target vehicle based on the simulation requirement, and generating a travel loss based on a difference between simulated travel data of each target vehicle generated during simulated traveling and the corresponding reference travel data;

adjusting the initial travel path corresponding to each target vehicle based on the travel loss until the travel loss satisfies a convergence condition to obtain a target travel path corresponding to each target vehicle; and obtaining target travel data of each target vehicle in the current time period based on the target travel path and departure time corresponding to each target vehicle.

4. The method according to claim 3, wherein the performing, based on each candidate travel path corresponding to the same target trip combination, path assignment on multiple target vehicles matched with the corresponding target traffic flow to obtain an initial travel path corresponding to each target vehicle comprises:

obtaining a historical path traffic flow distribution probability corresponding to each target trip combination;

performing, based on the historical path traffic flow distribution probability corresponding to the same target trip combination, traffic flow assignment on each corresponding candidate travel path to obtain an assigned traffic flow corresponding to each candidate travel path; and obtaining the initial travel path corresponding to each target vehicle based on each candidate travel path and the corresponding assigned traffic flow.

5. The method according to claim 3, wherein the adjusting a travel speed of each target vehicle dynamically during simulated traveling of each target vehicle based on the real-time mesoscopic simulated traffic condition data of the simulated road network until each target vehicle stops traveling comprises:

determining a traffic density within a preset range ahead of a current vehicle according to a current position and current travel state of each traveling vehicle in the simulated road network;

determining a reference travel speed of the current vehicle on a corresponding segment based on a traffic flow model and the traffic density; and updating the current position and current travel state of the current vehicle based on a real-time road state of each segment in the simulated road network and the reference travel speed of the current vehicle, and performing the operation of determining a traffic density within a preset range ahead of a current vehicle according to a current position and current travel state of each traveling vehicle in the simulated road network, until each target vehicle stops traveling.

6. The method according to claim 3, wherein when the simulation requirement is traffic reproduction, the determining reference travel data corresponding to each target vehicle based on the simulation requirement and generating a travel loss based on a difference between simulated travel data of each target vehicle generated during simulated traveling and the corresponding reference travel data comprises:

obtaining an actual traffic flow corresponding to each initial travel path in the current time period from a real road network, obtaining an actual travel speed corresponding to each initial travel path in the current time period, and obtaining a simulated traffic flow corresponding to each initial travel path from the simulated road network;

determining simulated travel time corresponding to each target vehicle based on arrival time and departure time of each target vehicle, and calculating a simulated travel speed corresponding to each initial travel path based on the simulated travel time and initial travel path corresponding to each target vehicle; and calculating the travel loss based on a speed difference between the actual travel speed and simulated travel speed corresponding to each initial travel path and a traffic flow difference between the actual traffic flow and simulated traffic flow corresponding to each initial travel path.

7. The method according to claim 3, wherein when the simulation requirement is vehicle balancing, the determining reference travel data corresponding to each target vehicle based on the simulation requirement and generating a travel loss based on a difference between simulated travel data of each target vehicle generated during simulated traveling and the corresponding reference travel data comprises:

predicting target travel time corresponding to each target vehicle based on the starting mesoscopic simulated traffic condition data;

determining simulated travel time corresponding to each target vehicle based on arrival time and departure time of each target vehicle; and calculating the travel loss based on a time difference between the target travel time and simulated travel time corresponding to each target vehicle.

8. The method according to claim 3, wherein when the simulation requirement is system optimization, the determining reference travel data corresponding to each target vehicle based on the simulation requirement and generating a travel loss based on a difference between simulated travel data of each target vehicle generated during simulated traveling and the corresponding reference travel data comprises:

calculating adjacent travel speeds corresponding to each segment in the simulated road network in adjacent simulated traveling processes based on simulated travel data of each target vehicle generated in the adjacent simulated traveling processes;

calculating a travel speed change direction and a travel speed change ratio based on the adjacent travel speeds corresponding to each segment in the simulated road network in the adjacent simulated traveling processes; and generating the travel loss based on the travel speed change direction and the travel speed change ratio.

9. The method according to claim 1, wherein the target travel data comprises a target travel path and departure time; and the performing microscopic traffic simulation on a traveling vehicle in a simulated road network corresponding to the starting mesoscopic simulated traffic condition data based on the target travel data to obtain real-time microscopic simulated traffic condition data corresponding to the current time period comprises:

adding each target vehicle to the simulated road network to travel according to the departure time and target travel path corresponding to each target vehicle to obtain real-time microscopic simulated travel data of the traveling vehicle in the simulated road network in the current time period;

determining starting microscopic simulated traffic condition data in a next time period corresponding to the current time period from the real-time microscopic simulated traffic condition data in the current time period; and converting the starting microscopic simulated traffic condition data into starting mesoscopic simulated traffic condition data corresponding to the next time period.

10. The method according to claim 1, further comprising:

generating auxiliary navigation data based on the simulated traffic condition in the current time period; and transmitting the auxiliary navigation data to a navigation server such that the navigation server performs navigation path planning according to the auxiliary navigation data.

11. The method according to claim 1, further comprising:

generating, from the microscopic traffic simulation corresponding to the current time period, a log of a traffic change process of the current time period; and visualizing, by using a log simulation mechanism, the log according to a 1:1 ratio to a physical clock and presenting a traffic system synchronized with a map environment.

12. A traffic simulation system, comprising:

a mesoscopic simulation server, comprising a first processor configured to:

obtain historical vehicle trajectory data and historical traffic flow data in a historical time period corresponding to a current time period;

obtain vehicle trajectory data corresponding to a target region from the historical vehicle trajectory data as target vehicle trajectory data, and obtain traffic flow data corresponding to the target region from the historical traffic flow data as target traffic flow data;

perform trip analysis on the target vehicle trajectory data to obtain an initial trip matrix corresponding to the historical time period, wherein the initial trip matrix comprises multiple target trip combinations and an initial traffic flow corresponding to each target trip combination;

expand the initial traffic flow corresponding to each target trip combination based on the target traffic flow data to obtain an intermediate traffic flow corresponding to each target trip combination;

check each intermediate traffic flow based on the target traffic flow data to obtain an estimated traffic flow corresponding to each target trip combination;

adjust, based on the estimated traffic flow corresponding to each target trip combination, the corresponding initial traffic flow to obtain a historical trip matrix corresponding to the historical time period;

obtain a target trip matrix corresponding to the current time period based on the historical trip matrix, the target trip matrix describing trip information in the current time period, and perform mesoscopic traffic simulation on a target vehicle corresponding to the target trip matrix based on starting mesoscopic simulated traffic condition data corresponding to the current time period and a simulation requirement to obtain target travel data of the target vehicle in the current time period, the starting mesoscopic simulated traffic condition data being determined by a microscopic simulation server according to real-time microscopic simulated traffic condition data in a previous time period corresponding to the current time period and transmitted to the mesoscopic simulation server, mesoscopic traffic simulation being traffic simulation directed to vehicle groups, and mesoscopic traffic simulation being used for assigning a target travel path corresponding to the simulation requirement to the target vehicle; and the microscopic simulation server, comprising a second processor configured to receive the target travel data transmitted by the mesoscopic simulation server, and perform microscopic traffic simulation on a traveling vehicle in a simulated road network corresponding to the starting mesoscopic simulated traffic condition data based on the target travel data to obtain real-time microscopic simulated traffic condition data corresponding to the current time period, the real-time microscopic simulated traffic condition data being used for obtaining a simulated traffic condition corresponding to the simulation requirement in the current time period, and microscopic traffic simulation being traffic simulation directed to vehicle individuals.

13. The system according to claim 12, further comprising:
a terminal, configured to receive a target video frame set transmitted by the microscopic simulation server, and play the target video frame set to form a three-dimensional animation, the target video frame set comprising multiple video frames in a target format, and each video frame in the target format being generated by the microscopic simulation server by performing simulation and rendering on the real-time microscopic simulated traffic condition data.

14. The system according to claim 13, wherein the target trip matrix comprises the multiple target trip combinations and a target traffic flow and multiple candidate travel paths corresponding to each of the multiple target trip combinations; and the first processor of the mesoscopic simulation server is further configured to implement:
performing, based on each candidate travel path corresponding to the same target trip combination, path assignment on multiple target vehicles matched with the corresponding target traffic flow to obtain an initial travel path corresponding to each target vehicle;
adding each target vehicle to the simulated road network according to departure time and initial travel path corresponding to each target vehicle;
adjusting a travel speed of each target vehicle dynamically during simulated traveling of each target vehicle based on the real-time mesoscopic simulated traffic condition data of the simulated road network until each target vehicle stops traveling;
determining reference travel data corresponding to each target vehicle based on the simulation requirement, and generating a travel loss based on a difference between simulated travel data of each target vehicle generated during simulated traveling and the corresponding reference travel data;
adjusting the initial travel path corresponding to each target vehicle based on the travel loss until the travel loss satisfies a convergence condition to obtain a target travel path corresponding to each target vehicle; and
obtaining target travel data of each target vehicle in the current time period based on the target travel path and departure time corresponding to each target vehicle.

15. The system according to claim 12, wherein the performing trip analysis on the target vehicle trajectory data to obtain an initial trip matrix corresponding to the historical time period comprises:
performing trajectory segmentation on the target vehicle trajectory data to obtain candidate travel paths respectively corresponding to multiple candidate vehicles, the candidate travel path comprising a candidate origin and a candidate destination;
performing origin clustering and destination clustering on each candidate travel path based on a reference point of interest to obtain an intermediate origin and intermediate destination corresponding to each candidate travel path;
clustering the candidate travel paths corresponding to the same intermediate origin and intermediate destination to obtain multiple target trip combinations, and according to a number of the candidate vehicles corresponding to the same target trip combination, obtaining an initial traffic flow corresponding to each target trip combination, the target trip combination comprising at least one candidate travel path corresponding to the same intermediate origin and intermediate destination; and
generating the initial trip matrix based on each target trip combination and the corresponding initial traffic flow and candidate travel path.

16. One or more non-transitory computer-readable storage media, storing computer-readable instructions, the computer-readable instructions, when executed by one or more processors, causing the one or more processors to implement:
obtaining historical vehicle trajectory data and historical traffic flow data in a historical time period corresponding to a current time period;
obtaining vehicle trajectory data corresponding to a target region from the historical vehicle trajectory data as target vehicle trajectory data, and obtaining traffic flow data corresponding to the target region from the historical traffic flow data as target traffic flow data;
performing trip analysis on the target vehicle trajectory data to obtain an initial trip matrix corresponding to the historical time period, wherein the initial trip matrix comprises multiple target trip combinations and an initial traffic flow corresponding to each target trip combination;
expanding the initial traffic flow corresponding to each target trip combination based on the target traffic flow data to obtain an intermediate traffic flow corresponding to each target trip combination;
checking each intermediate traffic flow based on the target traffic flow data to obtain an estimated traffic flow corresponding to each target trip combination;
adjusting, based on the estimated traffic flow corresponding to each target trip combination, the corresponding initial traffic flow to obtain a historical trip matrix corresponding to the historical time period;
obtaining a target trip matrix corresponding to the current time period based on the historical trip matrix, the target trip matrix describing trip information in the current time period;
performing mesoscopic traffic simulation on a target vehicle corresponding to the target trip matrix based on starting mesoscopic simulated traffic condition data corresponding to the current time period and a simulation requirement, to obtain target travel data of the target vehicle in the current time period, the starting mesoscopic simulated traffic condition data being determined according to real-time microscopic simulated traffic condition data in a previous time period corresponding to the current time period, the mesoscopic traffic simulation being traffic simulation directed to vehicle groups, and the mesoscopic traffic simulation being used for assigning a target travel path corresponding to the simulation requirement to the target vehicle; and performing microscopic traffic simulation on a traveling vehicle in a simulated road network corresponding to the starting mesoscopic simulated traffic condition data based on the target travel data to obtain real-time microscopic simulated traffic condition data corresponding to the current time period, the real-time microscopic simulated traffic condition data being used for obtaining a simulated traffic condition corresponding to the simulation requirement in the current time period, and microscopic traffic simulation being traffic simulation directed to vehicle individuals.

* * * * *